(12) United States Patent
Yamaguchi et al.

(10) Patent No.: US 7,146,633 B2
(45) Date of Patent: Dec. 5, 2006

(54) DIGITAL BROADCAST RECEIVING DEVICE

(75) Inventors: Koichiro Yamaguchi, Ashiya (JP); Naoya Takao, Kadoma (JP); Takashi Kakiuchi, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1076 days.

(21) Appl. No.: 09/758,829

(22) Filed: Jan. 11, 2001

(65) Prior Publication Data

US 2001/0042252 A1    Nov. 15, 2001

(30) Foreign Application Priority Data

Jan. 12, 2000    (JP)    ............................. 2000-003277

(51) Int. Cl.
*H04N 7/173*    (2006.01)

(52) U.S. Cl. .......................... 725/131; 725/80; 725/82; 725/91; 725/92; 725/114; 725/115

(58) Field of Classification Search ................ 725/105, 725/114, 80, 82, 91, 92, 115, 131; 715/716, 715/721, 723; 370/396; 379/207.13
See application file for complete search history.

(56) References Cited

U.S. PATENT DOCUMENTS

| | | | | |
|---|---|---|---|---|
| 5,003,384 A | * | 3/1991 | Durden et al. ............... | 725/104 |
| 5,583,864 A | * | 12/1996 | Lightfoot et al. ........... | 370/396 |
| 5,583,937 A | | 12/1996 | Ullrich et al. | |
| 5,619,249 A | | 4/1997 | Billock et al. | |
| 5,734,853 A | * | 3/1998 | Hendricks et al. .......... | 715/716 |
| 5,790,173 A | * | 8/1998 | Strauss et al. ............... | 725/114 |
| 5,945,987 A | | 8/1999 | Dunn | |
| 6,347,400 B1 | * | 2/2002 | Ohkura et al. ................ | 725/60 |
| 6,425,129 B1 | * | 7/2002 | Sciammarella et al. ....... | 725/38 |
| 6,532,590 B1 | * | 3/2003 | Chimoto ...................... | 725/43 |

FOREIGN PATENT DOCUMENTS

| | | |
|---|---|---|
| EP | 0 708 561 A2 | 4/1996 |
| JP | 2178795 | 7/1990 |

* cited by examiner

*Primary Examiner*—Kieu-Oanh Bui

(57) ABSTRACT

A receiving unit 101 repeatedly receives a transport stream, and a specifying unit 102 specifies a purchase state. A restoring unit 103 generates a first audio-digital (AV) signal and interactive data, and an AV reproducing unit 105 generates a second AV signal. A combining unit 106 generates a data-AV combined signal by combining the generated second AV signal and a data signal generated from the interactive data. A data presentation restricting unit 115 outputs the interactive data and a purchase state signal. A control unit 107 receives an operation signal from an inputting unit 110 and outputs it to a data operation restricting unit 116. A data analyzing unit 104 analyzes a presentation element contained in the interactive data and generates video data, which is the data signal. A data judging unit 117 judges whether a currently-presented presentation element is included in the same group as a presentation element that is a link destination of the presented presentation element. When the purchase state is a viewing permitted state, the data operation restricting unit 116 outputs the operation signal. When the purchase state is a preview state or viewing prohibited state and when the above two presentation elements are included in the same group, the operation restricting unit 116 also outputs the operation signal.

15 Claims, 29 Drawing Sheets

FIG. 3

206 PRESENTATION ELEMENT

BITMAP TABLE

| INDEX | BITMAP DATA |
|---|---|
| 0 | TOKYO |
| 1 | OSAKA |
| 2 | TO NEWS |

HYPERLINK TABLE

| INDEX | LINK DESTINATION |
|---|---|
| 211 | ID=512 |
| 210 | ID=511 |
| 212 | ID=521 |

TEXT TABLE

| INDEX | TEXT DATA |
|---|---|
| 0 | WEATHER FORECAST |

SCRIPT TABLE

| INDEX | SCRIPT DATA |
|---|---|
| 0 | If PayStatus=accept then go to ID=208<br>If PayStatus=preview then no action<br>If PayStatus=bad then hide |

FIG. 17

```
1  If purchase state signal = viewing permitted state
2      then link to presentation element 1
3  if purchase state signal = preview state
4      then no action
5  if purchase state signal = viewing prohibited state
6      then hide
```

FIG. 21

| INSTRUCTION REGISTRATION |
|---|
| If purchase state signal = viewing permitted state<br>  then perform link<br>If purchase state signal = preview state or viewing prohibited state<br>  then ignore link and<br>  generate message indicating that no operations are performed unless<br>  user purchases program and present generated message to user |

FIG. 24

PRESENTATION ELEMENT

| VIEWING ENABLED SIGNAL | VIEWING PERMITTED STATE |
|---|---|

BITMAP TABLE

| INDEX | BITMAP DATA |
|---|---|
| BITMAP INDEX | BITMAP DATA ONLY PRESENTED IN VIEWING PERMITTED STATE |

TEXT TABLE

| INDEX | TEXT DATA |
|---|---|
| TEXT INDEX | TEXT DATA ONLY PRESENTED IN VIEWING PERMITTED STATE |

SCRIPT TABLE

| INDEX | SCRIPT |
|---|---|
| SCRIPT INDEX | SCRIPT USED IN VIEWING PERMITTED STATE |

HYPERLINK TABLE

| INDEX | LINK DESTINATION |
|---|---|
| LINK INDEX | LINK DESTINATION IN VIEWING PERMITTED STATE |

DIGITAL BROADCAST RECEIVING DEVICE

This application is based on application No. 2000-003277 filed in Japan, the content of which is hereby incorporated by reference.

BACKGROUND OF THE INVENTION (1) Field of the Invention

The present invention relates to digital broadcast reception technology for receiving a repeatedly-transmitted broadcast wave that includes "interactive data", and for achieving pseudo-interactive communications.

(2) Description of the Prior Art

In recent years, fee-based television (TV) programs have been broadcasted.

Japanese Laid-Open Patent Application No. 11-243535 discloses a digital communication satellite broadcast service. For this communication satellite broadcast service, a plurality of transport streams (hereafter called "TS") for digital data are broadcasted in parallel. The number of transport streams broadcasted in parallel is equal to a number of transponders. A plurality of transport packets (hereafter "TP"), which contain data corresponding to a plurality of programs, are time-division multiplexed into each TS. A user selects a given program contained in a TS, and watches the program.

With a fee-based digital broadcast, a viewing of a program is restricted to predetermined viewers. To restrict viewers, the following method is used.

Encryption (hereafter, "scrambling") is performed separately for each TP (hereafter, "AV (audio-video) TP") containing video data and audio data for programs. A descrambling key to descramble such scrambled AV TP, and program attribute information for the programs make up program information (hereafter, "ECM") and are contained in another TP (hereafter, "ECM TP"). Such ECM TP and AV TP are broadcasted together. This ECM TP is also scrambled. A work key to descramble the scrambled ECM TP, and subscription information make up individual information (hereafter, "EMM") and are stored in an integrated circuit (IC) card, which is inserted into each receiving device. The scrambled ECM TP is first descrambled with the work key on the IC card, and the descrambling key is extracted from the descrambled ECM TP. After this, the program attribute information in the ECM and the subscription information, which is given to each user on an IC card, are compared to specify a program that can be descrambled. The specified program is then descrambled using the extracted descrambling key, and images and sounds for the program are presented to the user.

Such fee-based broadcast service usually allows users to watch a fee-based program at no charge for a predetermined time (hereafter a "preview time").

Digitalization of a broadcast makes it possible to broadcast a great amount of digital data information other than video and audio data. Such digital data information broadcast is now available in a digital satellite broadcast service. In this digital satellite broadcast service, digital data information is broadcasted with video data and the like in only one direction from a sending station, and therefore there is no interactive process with receiving terminals in this transmission.

Japanese Laid-Open Patent Application No. 10-313449 discloses one example of such broadcasting. According to this patent application, a sending station repeatedly broadcasts a plurality of sets of digital data information, and a receiving terminal receives one of the plurality of sets of digital data information while switching from one set of data information to another to simulate interactive communication with the sending station. In this specification, digital data information broadcasted in this manner is called "interactive data".

Broadcasting such interactive data, however, involves the following problems.

First, as there is no restrictions in viewing such interactive data during the aforementioned preview time, a viewer can view all the interactive data broadcasted with a previewed program, using a receiving terminal or the like during the preview time if the interactive data is not updated during a broadcast of the previewed program.

Secondly, interactive data is accumulated in memory of a receiving terminal, unlike video data and audio data. This allows a user freely to present interactive data, using the accumulated interactive data even after the preview time has expired. This is not desirable for a broadcast provider.

SUMMARY OF THE INVENTION

In view of the above problems, the present invention aims to provide a digital broadcast receiving device, a digital broadcast system, and a recording medium storing a receiving method and a receiving program, all of which can restrict use of interactive data relating to a fee-based program during a preview time.

The above object can be achieved by a digital broadcast receiving device that receives a broadcast wave including interactive data to achieve pseudo-interactive communications, the interactive data being repeatedly broadcasted, the digital broadcast receiving device including: a receiving unit for receiving the broadcast wave; a judging unit for judging a state that is established during the reception of the broadcast wave based on first information, the state being one of a preview state, a prohibited state, and a permitted state, wherein the first information shows conditions for using the received broadcast wave under a subscription contract, wherein in the preview state, the received broadcast wave is permitted to be used regardless of the subscription contract being made, and wherein in the prohibited state, the broadcast wave is prohibited from being used because the subscription contract is not made; and a restricting unit for restricting use of the interactive data when either the preview state or the prohibited state is judged as being established.

For this construction, use of interactive data can be restricted if either the preview state or the prohibited state is judged as being established. This can prevent users who have not paid a subscription fee from viewing all the interactive data.

Here, the interactive data may contain a plurality of sets of presentation data and link information which associates each of the plurality of sets of presentation data with a link to a set of presentation data. One of the plurality of sets of presentation data may be currently presented. The restricting unit may include: a user input receiving unit for receiving a user operation relating to the presented set of presentation data; a link unit for (a) specifying, based on the received user operation, a set of presentation data that is a link destination of a link associated by the link information with the presented set of presentation data if either the preview state or the prohibited state is judged as being established, (b) judging whether the specified set of presentation data and the presented set of presentation data are included in a same group, (c) obtaining the specified set of presentation data on judging that the specified set of presentation data and the presented set of presentation data are included in the same group, and (d) restricting use of interactive data relating to the received user operation on judging that the specified set of presentation data and the presented set of presentation data are not included in the same group; and a presenting unit for presenting the obtained set of presentation data.

For this construction, a set of presentation data that is a link destination of a link associated by the link information is obtained if this set of presentation is judged as being included in the same group as a currently-presented set of presentation data. When the two sets of presentation data are judged not to be included in the same group, a link operation designated by the received user operation is restricted. This can therefore provide a service that permits users who have not paid a subscription fee to view interactive data while at the same time restrict the use of interactive data.

Here, the interactive data may contain (a) a plurality of sets of presentation data, (b) link information which associates each of the plurality of sets of presentation data with a link to a set of presentation data, and (c) a script that contains a procedure to restrict use of the interactive data. The restricting unit may restrict the use of the interactive data by analyzing and executing the script.

With this construction, a script contained in a broadcast wave restricts use of interactive data. This allows a broadcast station to control restriction of interactive data use.

Here, the interactive data may contain (a) a plurality of sets of presentation data, (b) link information which associates each of the plurality of sets of presentation data with a link to a set of presentation data, and (c) a viewing enabled signal indicating either a viewing permission or a preview permission. One of the plurality of sets of presentation data may be currently presented. The restricting unit may include: a user operation receiving unit for receiving a user operation that designates a link operation; a link unit for obtaining a set of presentation data which is a link destination of the designated link operation if either a first condition or a second condition is fulfilled, and for restricting use of interactive data relating to the received user operation if neither the first condition nor the second condition is fulfilled, wherein in the first condition, the viewing enabled signal indicates the preview permission, and the preview state is judged as being established, and wherein in the second condition, the viewing enabled signal indicates the viewing permission, and the permitted state is judged as being established; and a presenting unit for presenting the obtained set of presentation data.

For this construction, a viewing enabled signal contained in a broadcast wave restricts use of interactive data, which allows a broadcast station to control restriction of interactive data use.

Here, the interactive data may contain (a) a plurality of sets of presentation data, and (b) link information which associates each of the plurality of sets of presentation data with a link to a set of presentation data. One of the plurality of sets of presentation data may be currently presented. The restricting unit may include: a user operation receiving unit for receiving a user operation; a counting unit for counting a number of user operations that have been received; a link unit for restricting use of interactive data relating to the received user operation when the counted number reaches a predetermine number and either the preview state or the prohibited state is judged as being established.

For this construction, the use of interactive data can be restricted in accordance with a number of user operations. This can provide a service that permits users to view interactive data based on the number of user operations while giving the restriction.

Here, the interactive data may contain (a) a plurality of sets of presentation data, and (b) link information which associates each of the plurality of sets of presentation data with a link to a set of presentation data. One of the plurality of sets of presentation data may be currently presented. The restricting unit may include: a user operation receiving unit for receiving a user operation that designates a link operation; a link unit for restricting use of interactive data relating to the received user operation if either the preview state or the prohibited state is judged as being established, and for obtaining a set of presentation data which is a link destination of the designated link operation if the permitted state is judged as being established; and a presenting unit for presenting the obtained set of presentation data.

With this construction, the use of interactive data relating to the received user operation is restricted if the preview state or the prohibited state is judged as being established. On the other hand, if the permitted state is judged as being established, a set of presentation data that is a link destination of the designated link operation is obtained to be presented. This prevents users who have not paid a subscription fee from viewing all the interactive data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows a data construction of a presentation element;

FIG. 17 shows an example script received by the interactive data receiving device 100;

FIG. 21 shows an example script received by the interactive data receiving device 100;

FIG. 24 shows an example presentation element received by the interactive data receiving device 100;

DESCRIPTION OF THE PREFERRED EMBODIMENTS

The following describes a digital broadcast system 10 of the present invention, using several embodiments.

1. Construction of Digital Broadcast System 10

Figure 1:
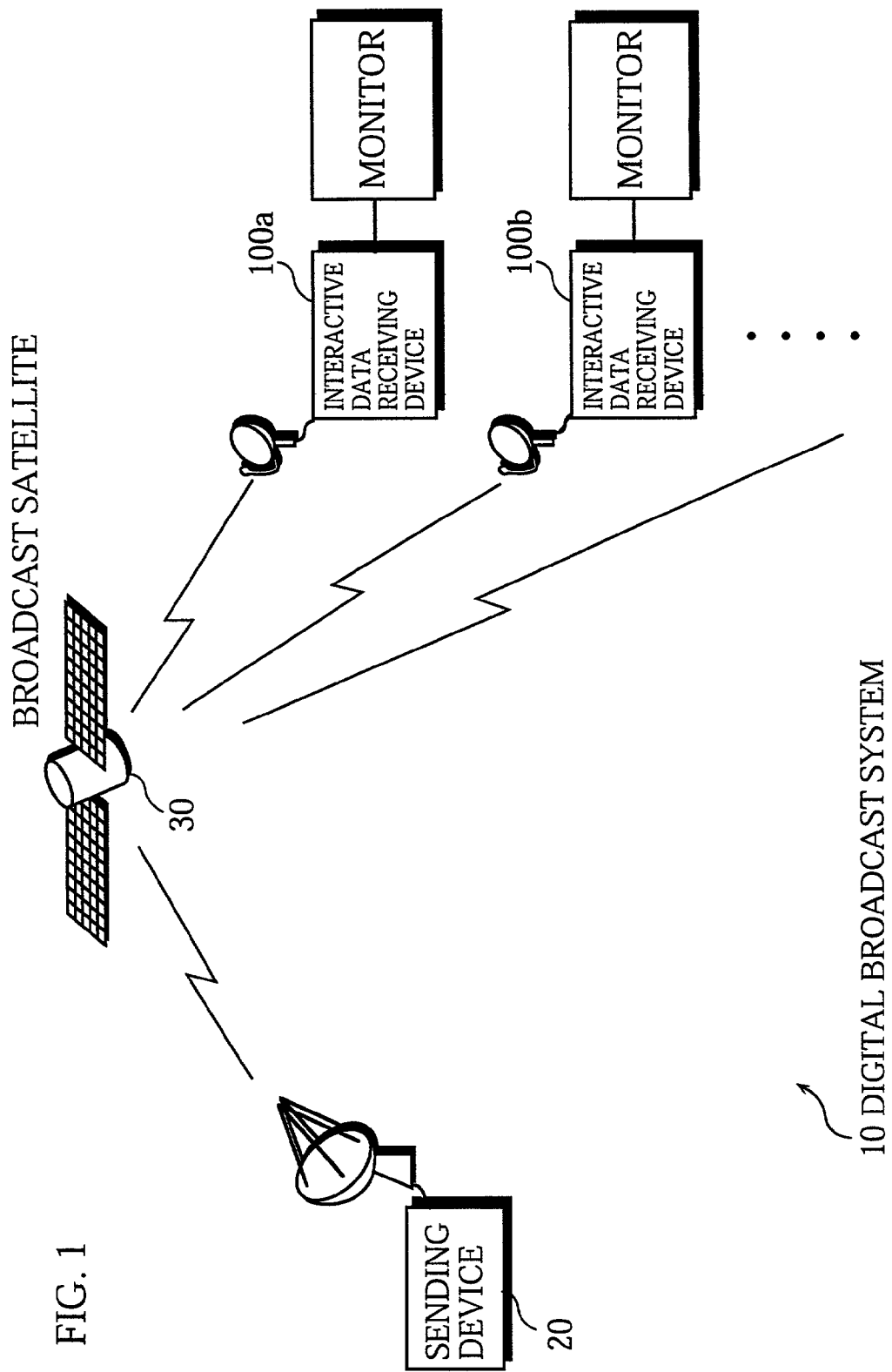
FIG. 1 is a block diagram showing a construction of a digital broadcast system 10 of an embodiment according to the present invention.

As shown in FIG. 1, the digital broadcast system 10 comprises a sending device 20, a broadcast satellite 30, a plurality of interactive data receiving devices 100a, 100b . . . , and a plurality of monitors.

1.1 Sending Device 20

The sending device 20 is installed in a broadcast station that provides a digital broadcast service, and sends an MPEG2 (Moving Picture Expert Group) TP (transport stream) as a broadcast wave via the broadcast satellite 30. This MPEG2 TS contains a reception signal and viewing permission information that is used to restrict a viewing of a fee-based program and charge a fee-based program. The reception signal is composed of video data, audio data, interactive data, and the like.

Figure 2:
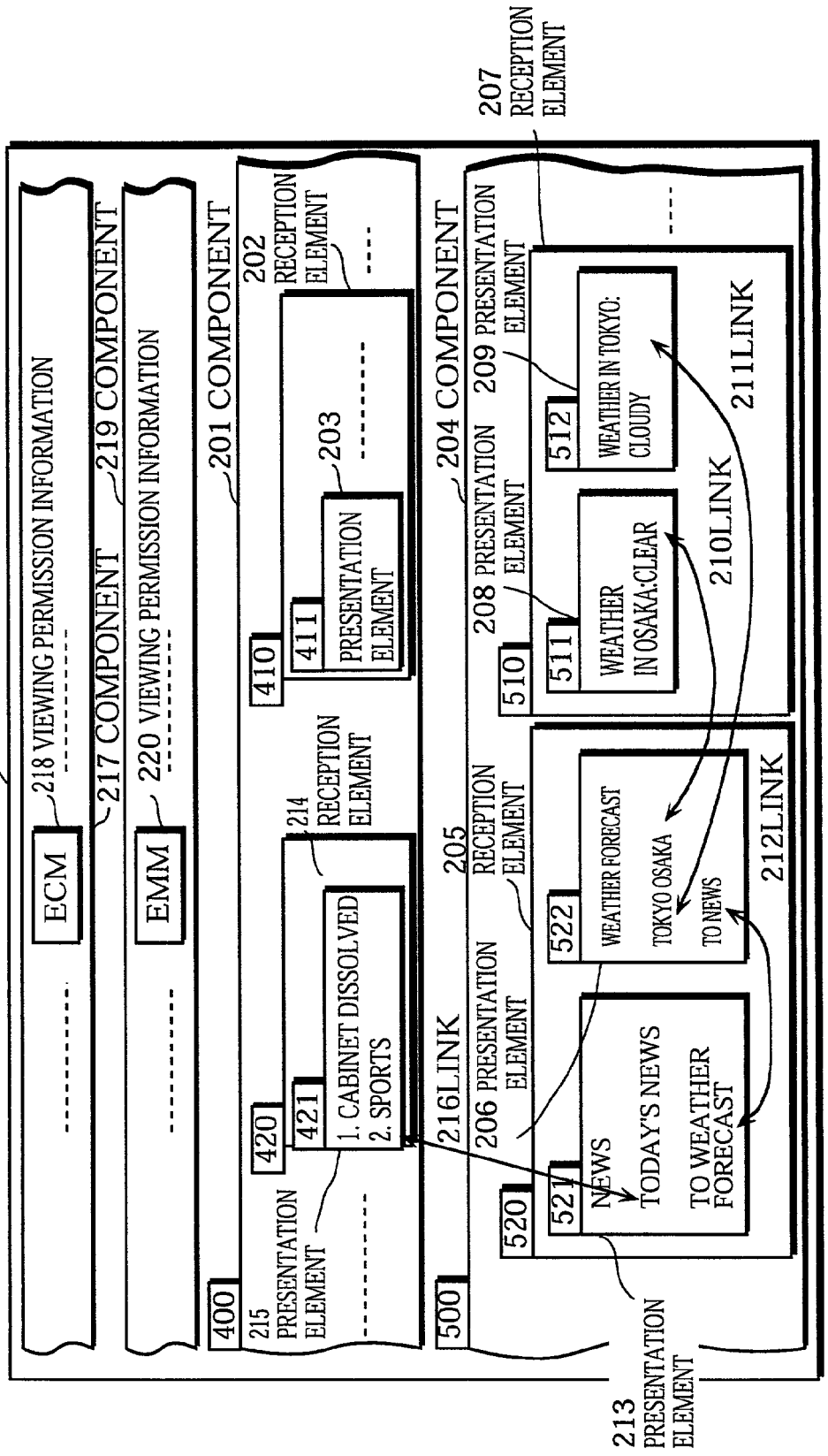
FIG. 2 shows a data construction of MPEG2 (Moving Picture Expert Group) transport stream 200.

FIG. 2 shows a data construction of an MPEG2 TS used to transmit interactive data.

When transmitted, the MPEG2 TS 200 is divided into packets on a transmission channel. Each packet contains a different packet ID (PID), which is identification information for the packet. A plurality of packets that has the same PID to be transmitted make up the same component.

As shown in FIG. 2, the MPEG2 TS 200 includes components 217, 219, 201, 204, and other components that are not shown in the figure. Each component contains a different component ID that identifies the component. The components 201 and 204 contains component IDs "400" and "500", respectively. Component IDs of the components 217 and 219 are not shown in the figure.

The component 217 includes viewing permission information 218, which contains subscription information given for each program. The subscription information contains, for instance, information showing that a program is allowed to be viewed periodically, and information showing that a program is charged on an as-used basis as in Pay Per View. Video data and audio data are included in a video data component and an audio data component, which are not shown in the figure.

The component 219 includes viewing permission information 220, which contains a user ID that identifies a user who subscribes to a program.

The component 201 includes reception elements 202, 214, and other reception elements. The reception element 202 contains a presentation element 203 and other presentation elements.

Each reception element has a different reception element ID to identify the reception element, and each presentation element has a different presentation ID to identify the presentation element.

More specifically, the reception elements 202 and 214 are identified by reception element IDs "410" and "420", as shown in FIG. 2. The presentation element 203 is identified by a presentation element ID "411".

The component 204 includes reception elements 205, 207, and other reception elements. The reception element 205 includes presentation elements 206 and 213, and other presentation elements. The reception element 207 contains presentation elements 208 and 209, and other presentation elements.

In the MPEG2 transport stream 200, the components 201 and 204 are interactive data, and reception elements included in these components 201 and 204 are repeatedly transmitted.

With this interactive data, one presentation element is switched to another when links defined in the interactive data are followed. A presentation element includes text data, bitmapped data, hyperlink data, and a script describing a procedure, as shown in FIG. 17.

FIG. 3 shows a data construction of the presentation element 206 as one example.

As shown in the figure, the presentation element 206 includes a bitmap table, a text table, a script table, and a hyperlink table.

The bitmap table stores a pair composed of a set of bitmap data to be displayed and a bitmap index which identifies this set of bitmap data. Specifically, the bitmap table associates indexes "0", "1", and "2" with sets of bitmap data "TOKYO", "OSAKA", and "TO NEWS", respectively.

The text table stores a pair composed of a set of text data and a text index identifying this set of text data. Specifically, the text table associates a text index "0" with a set of text data "WEATHER FORECAST".

The script table stores a pair composed of a script describing a procedure, and a script index identifying this script. Specifically, the script table associates a script index "0" with a script.

The hyperlink table associates a link index, which identifies a link, with a destination of this link. Specifically, the hyperlink table associates link indexes "210", "211", and "212" with "ID=512", "ID=511", and "ID=521" that each identify a link destination.

Note that two pairs written in the same row in the bitmap table and the hyperlink table are associated with one another.

More specifically, with the presentation element 206, bitmap data "OSAKA" is linked via a link of the link index "210" (hereafter, this link is referred to as "a link '210'") to the presentation element 208. Bitmap data "TOKYO" is linked via a link of the link index "211" (hereafter, a link "211") to the presentation element 209.

Similarly, the presentation element 208 is linked via the link 210 to the presentation element 206, and the presentation element 209 is linked via the link 211 to the presentation element 206.

1.2 Construction of Interactive Data Receiving Device 100

The interactive data receiving devices 100a, 100b ... have the same construction. The following therefore uses an interactive data receiving device 100 to describe the construction common to all the interactive data receiving devices 100a, 110b ....

Figure 4:
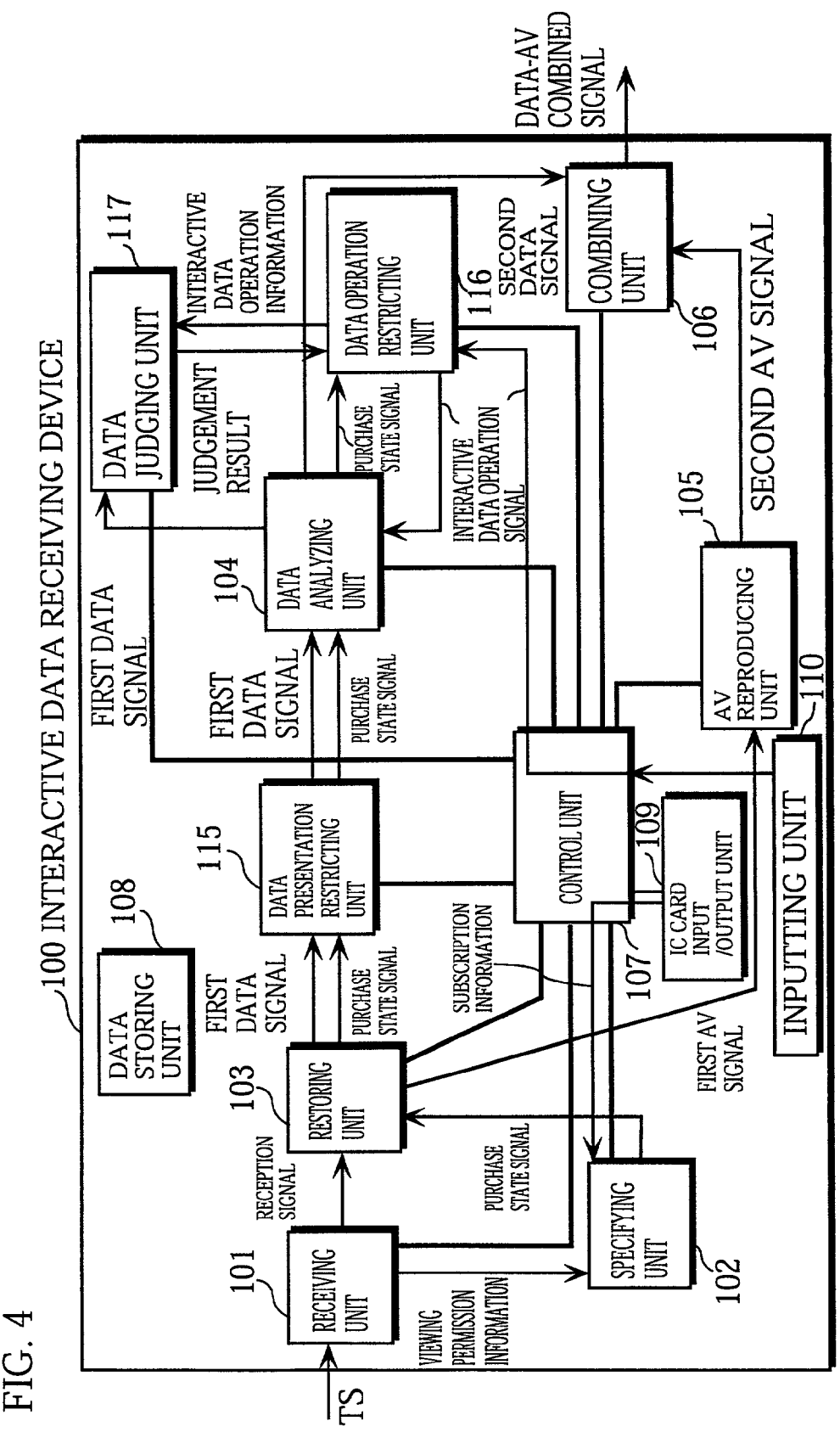
FIG. 4 is a block diagram showing a construction of an interactive data receiving device 100.

As shown in FIG. 4, the interactive data receiving device 100 includes a receiving unit 101, a specifying unit 102, a restoring unit 103, a data analyzing unit 104, an AV reproducing unit 105, a combining unit 106, a control unit 107, a data storing unit 108, an IC card input/output unit 109, an inputting unit 110, a data presentation restricting unit 115, a data operation restricting unit 116, and a data judging unit 117.

(1) Data Storing Unit 108

Figure 5:
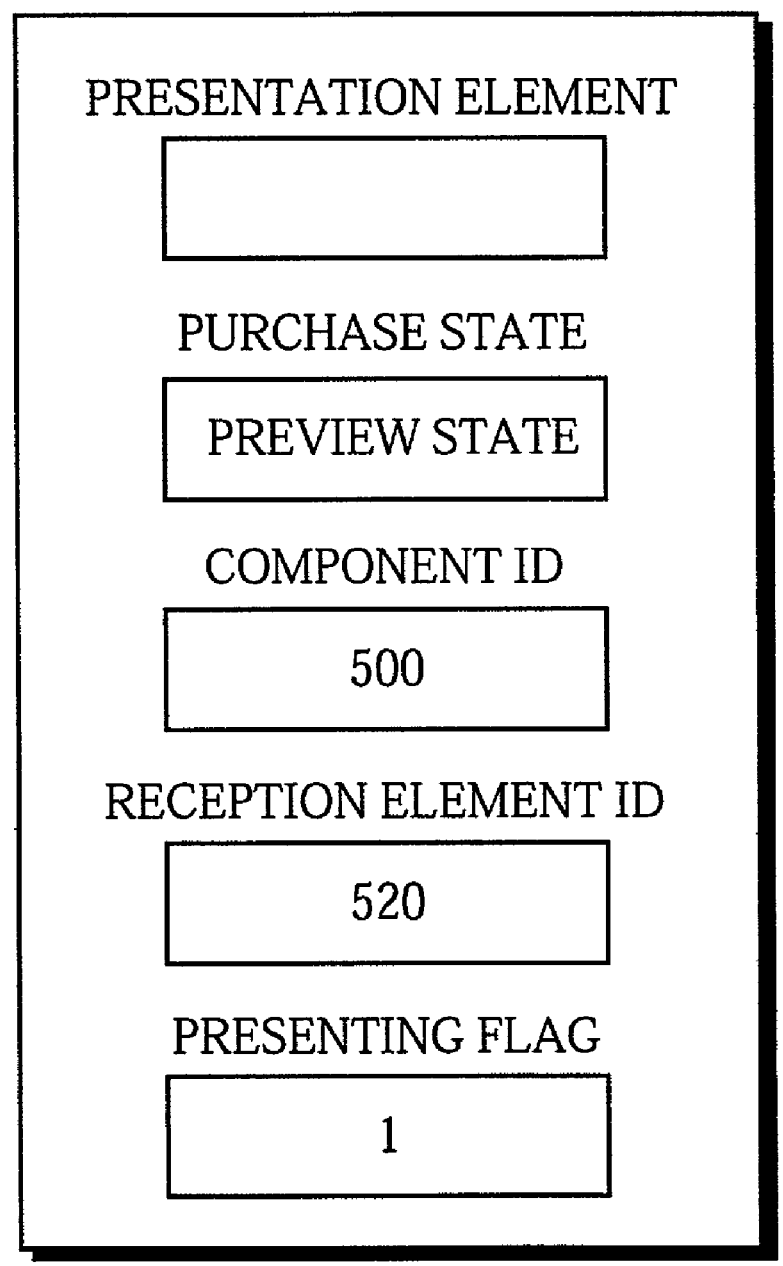
FIG. 5 shows information stored in the interactive data receiving device 100.

The data storing unit 108 is composed of semiconductor memory, and has areas that store a presentation element, a purchase state, a component ID, a reception element ID, and a presenting element flag, as shown in FIG. 5.

The presentation element was described above, and so will not be described.

The purchase state shows a state of a program presented to a user. The purchase state is shown as a value representing one of the following states: a viewing permitted state; a preview state; and a viewing prohibited state. The viewing permitted state is a state in which the user has purchased the program and is permitted to view the program. The preview state is a state in which the user, who has not purchased the program, is permitted to view the program for a predetermined time (hereafter, "a preview time"). The preview time may be one minute, for instance. The viewing prohibited state is a state in which the above preview time has expired and the user who has not purchased the program is prohibited from viewing.

The presenting element flag indicates whether the stored presentation element is now presented by the monitor. When the presenting element flag is shown as "1", the stored presentation element is presented by the monitor. When the presenting element flag is shown as "0", the presentation element is not presented.

(2) IC Card Input/Output Unit 109

The IC card input/output unit 109 performs a read from an IC card.

This IC card is composed of semiconductor memory, and stores subscription information for the user. The IC card is inserted into the interactive data receiving device 100 by the user, and connected to the IC card input/output unit 109.

The IC card input/output unit 109 reads the subscription information from the IC card, and outputs the read subscription information to the specifying unit 102 via the control unit 107.

(3) Receiving Unit 101

The receiving unit 101 receives an MPEG2 TS (hereafter, "TS"), which is transmitted repeatedly from the sending device 20 as a broadcast wave, and extracts a reception signal and viewing permission information from the received TS. This reception signal contains video data, audio data, and interactive data. The receiving unit 101 then outputs the extracted reception signal to the restoring unit 103, and the extracted viewing permission information to the specifying unit 102.

(4) Specifying Unit 102

The specifying unit 102 receives the viewing permission information from the receiving unit 101, and specifies a purchase state, using the received viewing permission information as follows.

The specifying unit 102 receives the subscription information stored on the IC card from the IC card input/output unit 109 via the control unit 107, and compares this subscription information with subscription information in the received viewing permission information. When the two is the same, the specifying unit 102 judges that the user has purchased a fee-based program under contract and specifies the viewing permitted state as the purchase state. When the two is not the same, the specifying unit 102 judges that the user has not purchased the fee-based program, and further judges whether the present time is in the preview time. If so, the specifying unit 102 specifies the preview state as the purchase state. If not, i.e., the present time has passed the preview time, the specifying unit 102 specifies the viewing prohibited state as the purchase state.

The specifying unit 102 then generates a purchase state signal that is a value showing the specified purchase state, and outputs the generated purchase state signal to the restoring unit 103.

Note that the specifying unit 102 may alternatively output this purchase state signal directly to the data analyzing unit 104, the data presentation restricting unit 115, and the data operation restricting unit 116.

(5) Restoring Unit 103

On receiving the reception signal from the receiving unit 101, the restoring unit 103 separates this reception signal to generate the video data, the audio data, and the interactive data. The restoring unit 103 outputs the generated audio data and video data to the AV reproducing unit 105 as a first AV signal, and outputs the generated interactive data to the data presentation restricting unit 115 as a first data signal. The restoring unit 103 also receives the purchase state signal from the specifying unit 102, stores this state signal, and outputs a signal that is the same as the state signal to the data presentation restricting unit 115.

(6) AV Reproducing Unit 105

The AV reproducing unit 105 receives the first AV signal from the restoring unit 103, reproduces this first AV signal to generate a second AV signal, and outputs the generated second AV signal to the combining unit 105.

(7) Combining Unit 106 and Monitor

The combing unit 106 receives the second AV signal from the AV reproducing unit 105, and a second data signal from the data analyzing unit 104. The combining unit 106 then combines the second AV signal and the second data signal to generate a data-AV combined signal, and outputs the generated data-AV combined signal to the monitor connected to the interactive data receiving device 100.

The monitor then receives this data-AV combined signal, and outputs the received data-AV combined signal.

(8) Data Presentation Restricting Unit 115

On receiving the first data signal and the purchase state signal from the restoring unit 103, the data presentation restricting unit 115 outputs them to the data analyzing unit 104.

(9) Inputting Unit 110

The inputting unit 110 is composed of a remote controller or the like. This remote controller has buttons on its surface, such as a power ON/OFF button, numeric buttons, an "UP"

button, a "DOWN" button, a "RIGHT" button, a "LEFT" button, a select button, a selection confirmation button. When the user pushes one of these buttons, the inputting unit 110 generates an interactive data operation signal containing button information corresponding to the pushed button, and outputs the interactive data operation signal to the control unit 107.

(10) Control Unit 107

On receiving the interactive data operation signal from the inputting unit 110, the control unit 107 outputs it to the data operation restricting unit 116.

(11) Data Analyzing Unit 104

The data analyzing unit 104 receives the first data signal and the purchase state signal from the data presentation restricting unit 115, and receives the interactive data operation signal from the data operation restricting unit 116.

The data analyzing unit 104 then analyzes one of presentation elements included in the first data signal, and generates video data for the analyzed presentation element presented to the user. The data analyzing unit 104 then outputs the generated video data as the second data signal to the combing unit 106. In more detail, the presentation elements in the above first data signal includes a presentation element that contains information showing that this presentation element should be first presented. The data analyzing unit 104 first specifies this presentation element, and then generates and outputs the second data signal for the specified presentation element.

When receiving the interactive data operation signal from the control unit 107, the data analyzing unit 104 selects one of the plurality of presentation elements included in the above first data signal in accordance with the received interactive data operation signal. The data analyzing unit 104 then generates a second data signal for the selected presentation element as described above, and outputs the generated second data signal.

More specifically, when video data for the presentation element 206 is displayed by the monitor and the user selects "TOKYO", for instance, the control unit 107 receives the interactive data operation signal indicating that "TOKYO" is selected, which is outputted to the data analyzing unit 104. The data analyzing unit 104 then selects the presentation element 209 which is a link destination of "TOKYO", extracts the selected presentation element 209 from the first data signal, and generates video data from the extracted presentation element 209. After this, the data analyzing unit 104 outputs the generated video data as the second data signal via the combining unit 106 to the monitor, which then displays this video data.

The data analyzing unit 104 also outputs the received purchase state signal and first data signal to the data operation restricting unit 116 and the data judging unit 117, respectively.

(12) Data Judging Unit 117

The data judging unit 117 receives the first data signal from the data analyzing unit 104, and interactive data operation information from the data operation restricting unit 116.

The data judging unit 117 then specifies, out of a bitmap table contained in a currently-presented presentation element included in the received first data signal, a pair composed of: (a) bitmap data specified by the received interactive data operation information; and (b) a bitmap index.

After this, the data judging unit 117 specifies, out of a hyperlink table in the above presentation element, a pair which is associated with the pair specified above and composed of a link index and a link destination, and recognizes the link destination.

The data judging unit 117 then compares the ID of the recognized link destination with the ID of the currently-presented presentation element to judge whether a presentation element of the link destination and the currently-presented presentation element belong to the same component. In more detail, the data judging unit 117 judges whether the highest-order digit of the link destination ID and that of the currently-presented presentation element ID are the same. If so, the data judging unit 117 generates a judgement result showing that the two is the same (hereafter, this judgement result is referred to as "same"). If not, the data judging unit 117 generates a judgement result showing that the two is not the same (hereafter, this judgement result is referred to as "different").

Note that this judging method is only one example, and other judging methods may be alternatively used.

The data judging unit 117 then outputs the generated judgement result to the data operation restricting unit 116.

Each presentation element ID consists of three decimal digits. When IDs of different presentation elements have the same highest-order digit, these presentation elements are included in the same component. When IDs of different presentation elements have the same second-order digit, as well as the same highest-order digit, these presentation elements are included in the same reception element in the same component.

(13) Data Operation Restricting Unit 116

The data operation restricting unit 116 receives the interactive data operation signal from the control unit 107, the judgement result from the data judging unit 117, and the purchase state signal from the data analyzing unit 104.

The data operation restricting unit 116 outputs the received interactive data operation signal to the data judging unit 117 as the interactive data operation information.

When the received purchase state signal indicates the viewing permitted state, the data operation restricting unit 116 outputs the received interactive data operation signal to the data analyzing unit 104. The data operation restricting unit 116 also outputs the interactive data operation signal to the data analyzing unit 104 when the received purchase state signal indicates either the preview state or the viewing prohibited state and the received judgement result is shown as "same".

1.3 Processing of Interactive Data Receiving Device 100

The following describes the processing of the interactive data receiving device 100.

(1) Overall Processing

Figure 6:
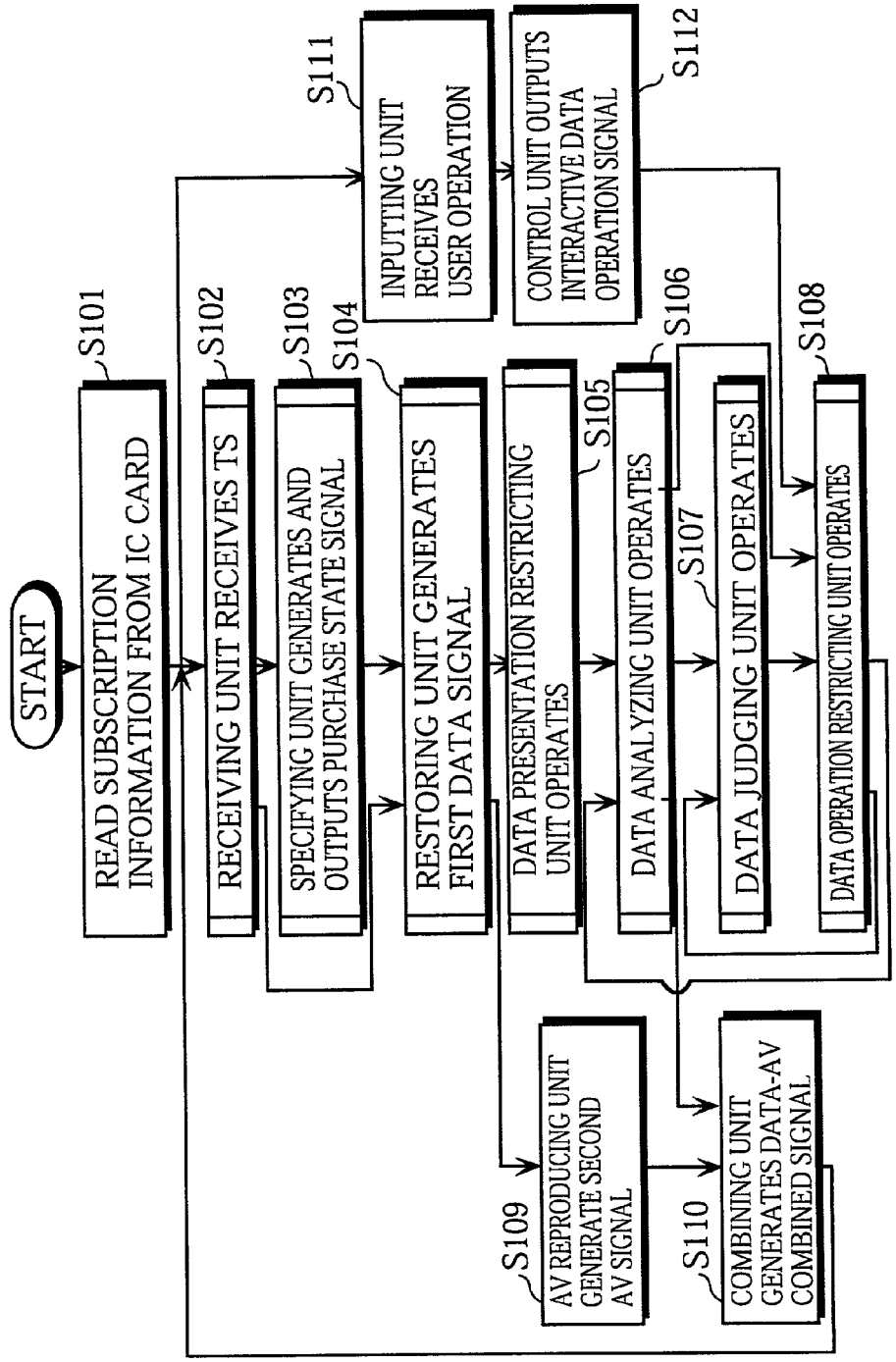
FIG. 6 is a flowchart showing the overall processing of the interactive data receiving device 100.

The following describes the overall processing of the interactive data receiving device 100 with reference to a flowchart of FIG. 6.

The IC card input/output unit 109 reads subscription information for a user from an IC card (step S101).

The receiving unit 101 receives a TS (step S102), and the specifying unit 102 generates and outputs a purchase state signal (step S103).

When both steps S102 and S103 have been completed, the restoring unit 103 generates a first data signal (step S104).

After step S101, on the other hand, the inputting unit 110 receives a user operation (step S111), and the control unit 107 outputs an interactive data operation signal (step S112).

After step S104, the data presentation restricting unit 115 performs operations (step S105), and the data analyzing unit 104 performs operations (step S106). The data judging unit 117 then performs operations (step S107), and the data operation restricting unit 116 performs operations (step S108). The control flow then returns to step S106.

After step S104, the AV reproducing unit 105 generates a second AV signal (step S109). When both steps S109 and S106 have been completed, the combining unit 106 generates a data-AV combined signal, and outputs it to the monitor (step S110). After this, the control flow returns to step S102 so that the operations are repeated.

(2) Processing of Receiving Unit 101

Figure 7:
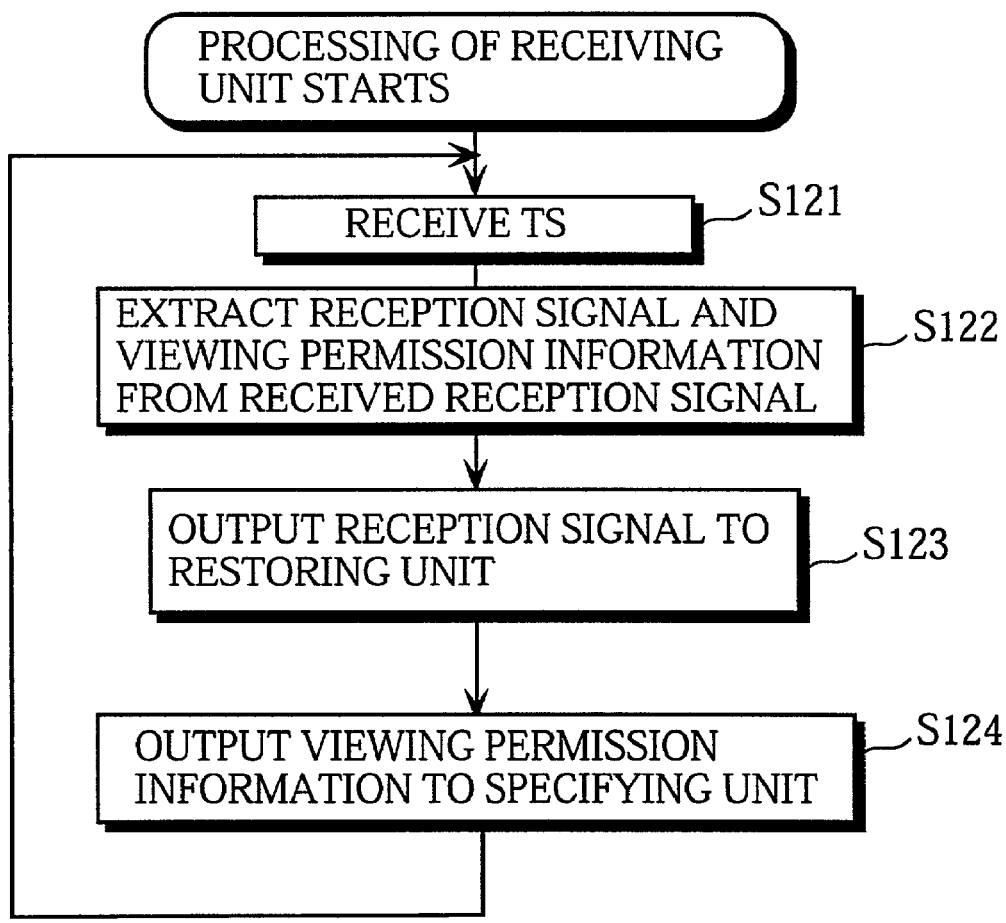
FIG. 7 is a flowchart showing the processing of a receiving unit.

The following describes the processing of the receiving unit 101 with reference to a flowchart of FIG. 7.

The receiving unit 101 receives a TS (step S121), and extracts a reception signal and viewing permission information from the received TS (step S122). The receiving unit 101 then outputs the extracted reception signal to the restoring unit 103 (step S123), and outputs the extracted viewing permission information to the specifying unit 102 (step S124). The control flow then moves to step S121, and the above processing is repeated.

(3) Specifying Unit 102

Figure 8:
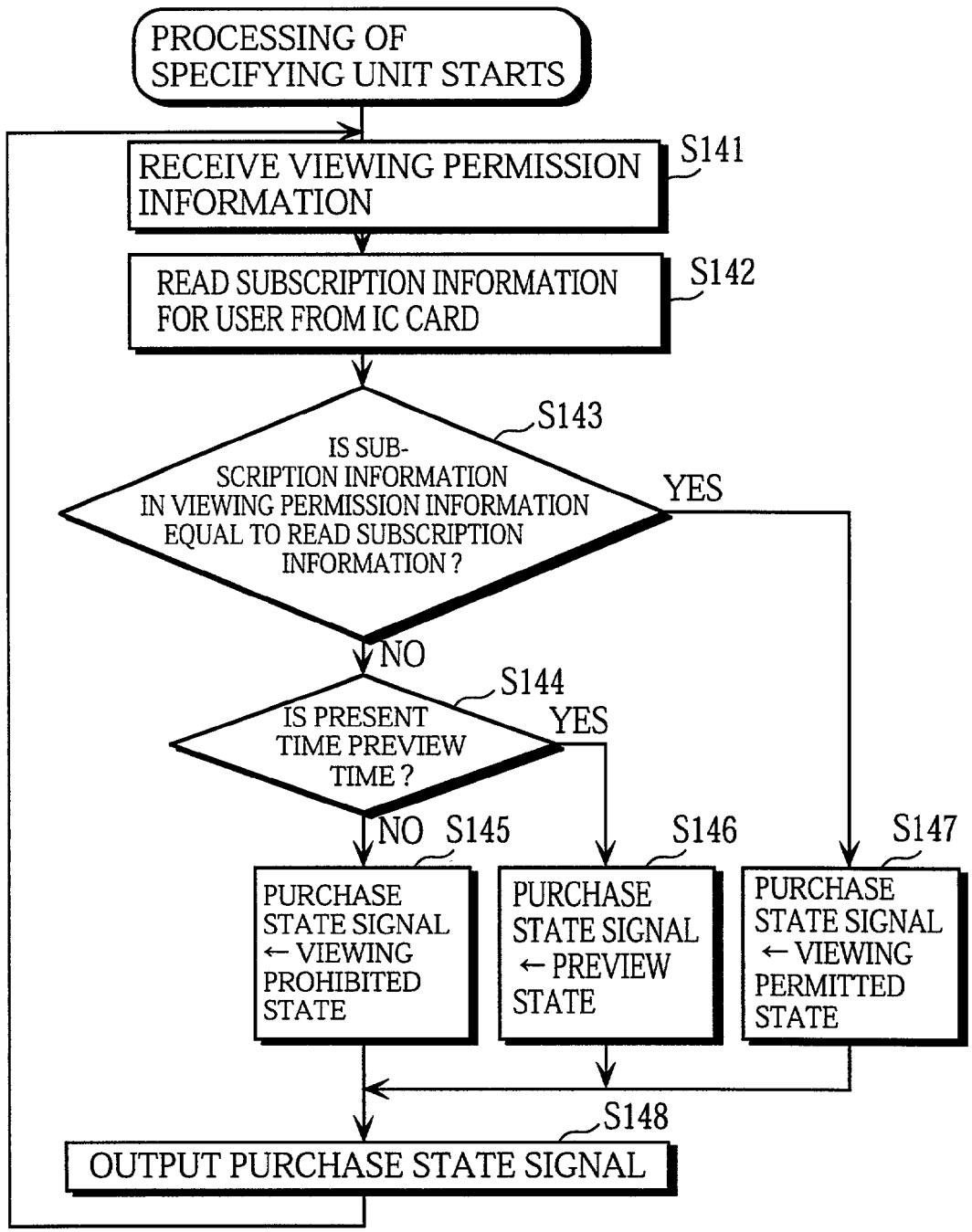
FIG. 8 is a flowchart showing the processing of a specifying unit.

The following describes the processing of the specifying unit 102 with reference to a flowchart of FIG. 8.

The specifying unit 102 receives the viewing permission information from the receiving unit 101 (step S141), and obtains subscription information for the user from the IC card input/output unit 109 via the control unit 107 (step S142). The specifying unit 102 then compares this obtained subscription information with subscription information in the received viewing permission information. If the two is the same (step S143), the specifying unit 102 generates a purchase state signal indicating the viewing permitted state (step S147). If the two is not the same (step S143), the specifying unit 102 judges whether the present time is a preview time (step S144). If so, the specifying unit 102 generates a purchase state signal indicating the preview state (step S146). If not, the specifying unit 102 generates a purchase state signal indicating the viewing prohibited state (step S145).

After this, the specifying unit 102 outputs the generated purchase state signal to the restoring unit 103 (step S148).

(4) Processing of Restoring Unit 103

Figure 9:
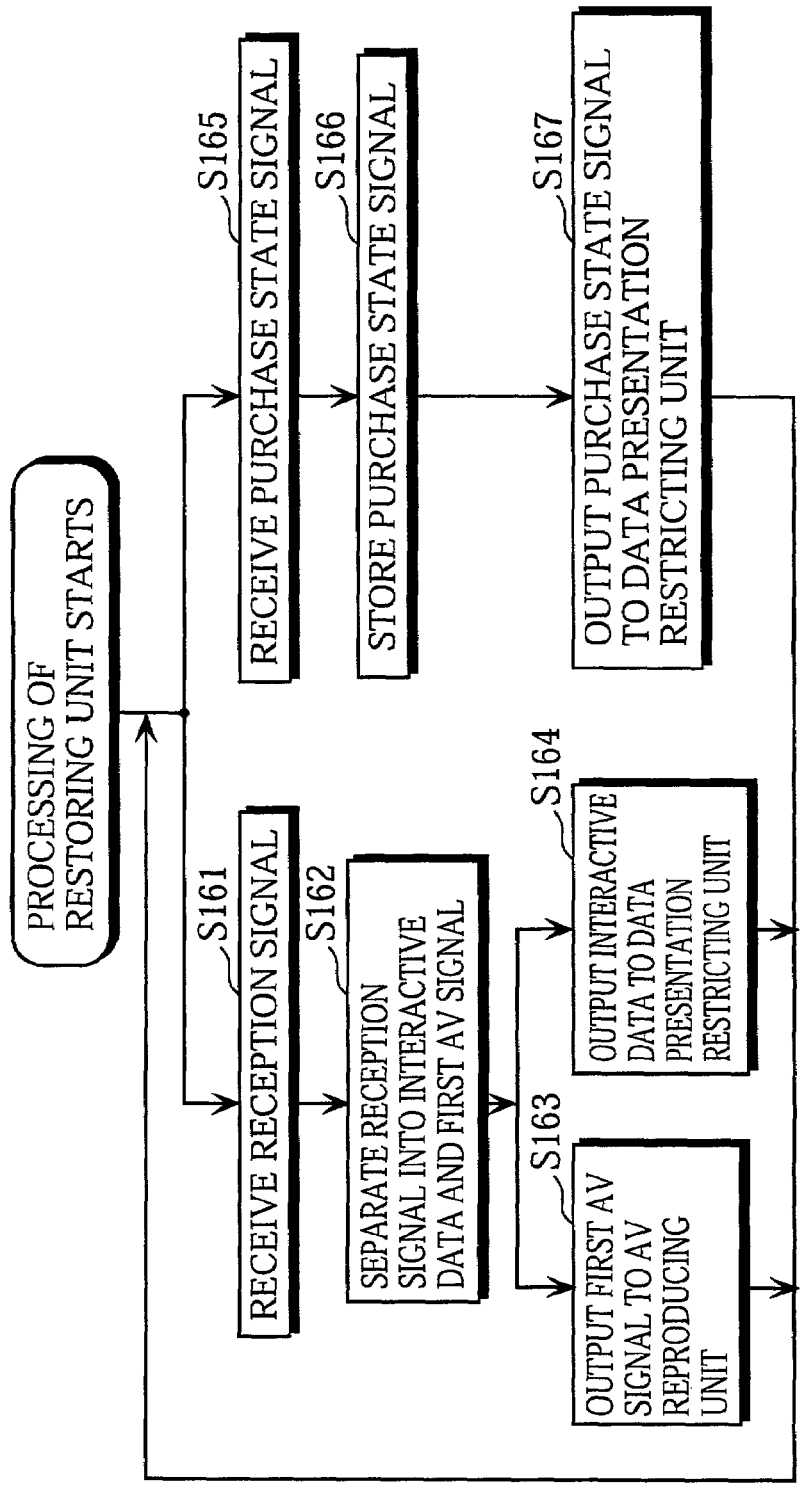
FIG. 9 is a flowchart showing the processing of a restoring unit.

The following describes the processing of the restoring unit 103 with reference to a flowchart of FIG. 9.

The restoring unit 103 receives the reception signal from the receiving unit 101 (step S161), and separates the received reception signal to generate video data, audio data, and interactive data (step S162). The restoring unit 103 then outputs the generated audio data and video data to the AV reproducing unit 105 as a first AV signal (step S163), and outputs the generated interactive data to the data presentation restricting unit 115 as a first data signal (step S164). The control flow them moves to either step S161 or step S165, and the processing is repeated.

The restoring unit 103 also receives the purchase state signal from the specifying unit 102 (step S165), stores this state signal (step S166), and outputs the same signal as this purchase state signal to the data presentation restricting unit 115 (step S167). The control flow then returns to either step S161 or step S165, and the processing is repeated.

(5) Processing of Data Presentation Restricting Unit 115

Figure 10:
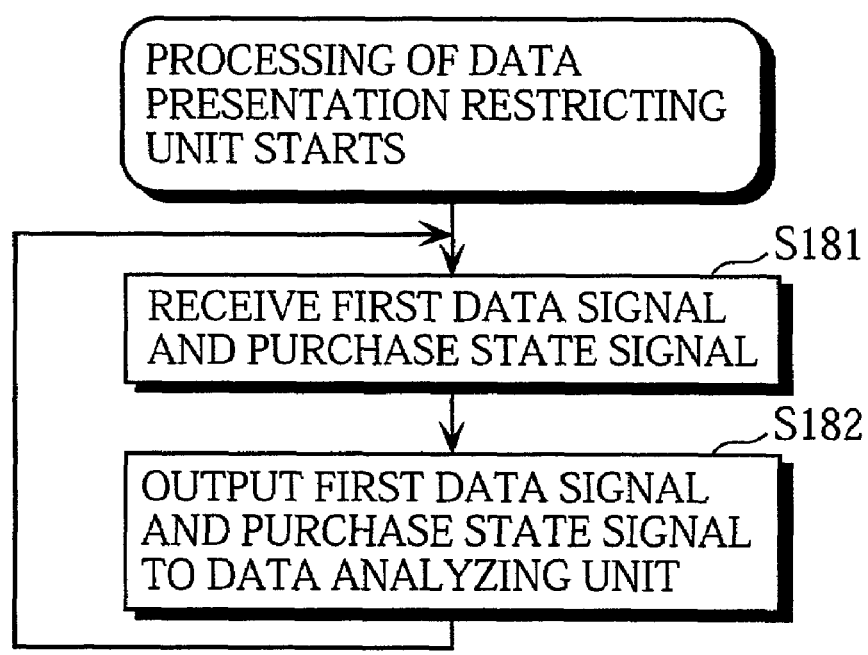
FIG. 10 is a flowchart showing the processing of a data presentation restricting unit.

The following describes the processing of the data presentation restricting unit 115 with reference to the flowchart of FIG. 10.

The data presentation restricting unit 115 receives the first data signal and the purchase state signal from the restoring unit 103 (step S181), and outputs them to the data analyzing unit 104 (step S182).

(6) Processing of Data Analyzing Unit 104

Figure 11:
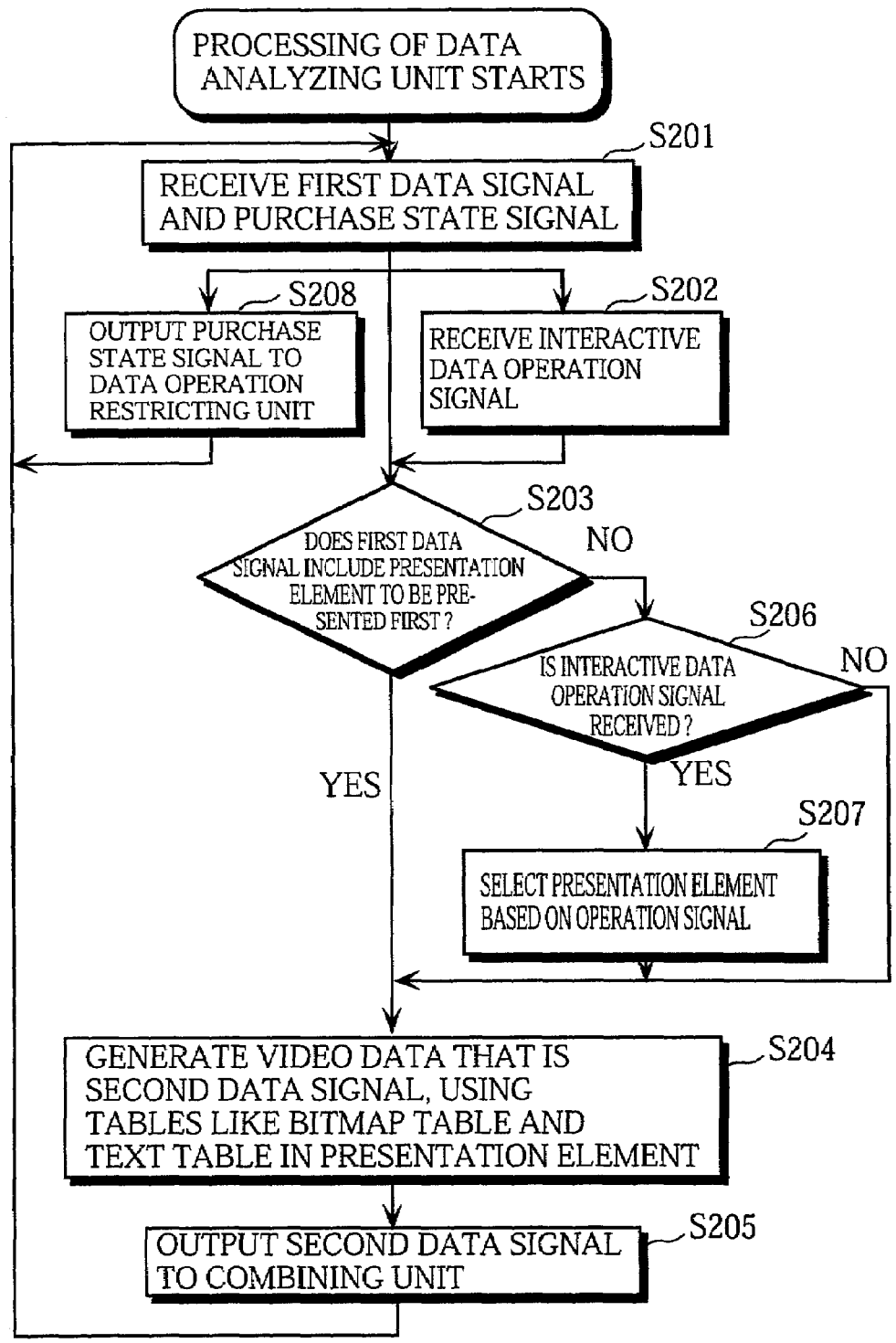
FIG. 11 is a flowchart showing the processing of a data analyzing unit.

The following describes the processing of the data analyzing unit 104 with reference to a flowchart of FIG. 11.

The data analyzing unit 104 receives the first data signal and the purchase state signal from the data presentation restricting unit 115 (step S201), and receives an interactive data operation signal from the data operation restricting unit 116 (step S202).

When the received first data signal does not include any presentation element containing information showing that the presentation element should be first presented (step S203) and the data analyzing unit 104 has received the interactive data operation signal (step S206), the data analyzing unit 104 selects a presentation element indicated by the received interactive data operation signal from the received first data signal (step S207).

The data analyzing unit 104 then generates video data, referring to tables, such as a bitmap table and a text table, contained in the selected (or firstly-presented) presentation element (step S204), and outputs the generated video data as a second data signal to the combining unit 106 (step S205).

The data analyzing unit 104 also outputs the received purchase state signal to the data operation restricting unit 116 (step S208).

After this, the control flow returns to step S201, and the processing is repeated.

(7) Processing of Data Judging Unit 117

Figure 12:
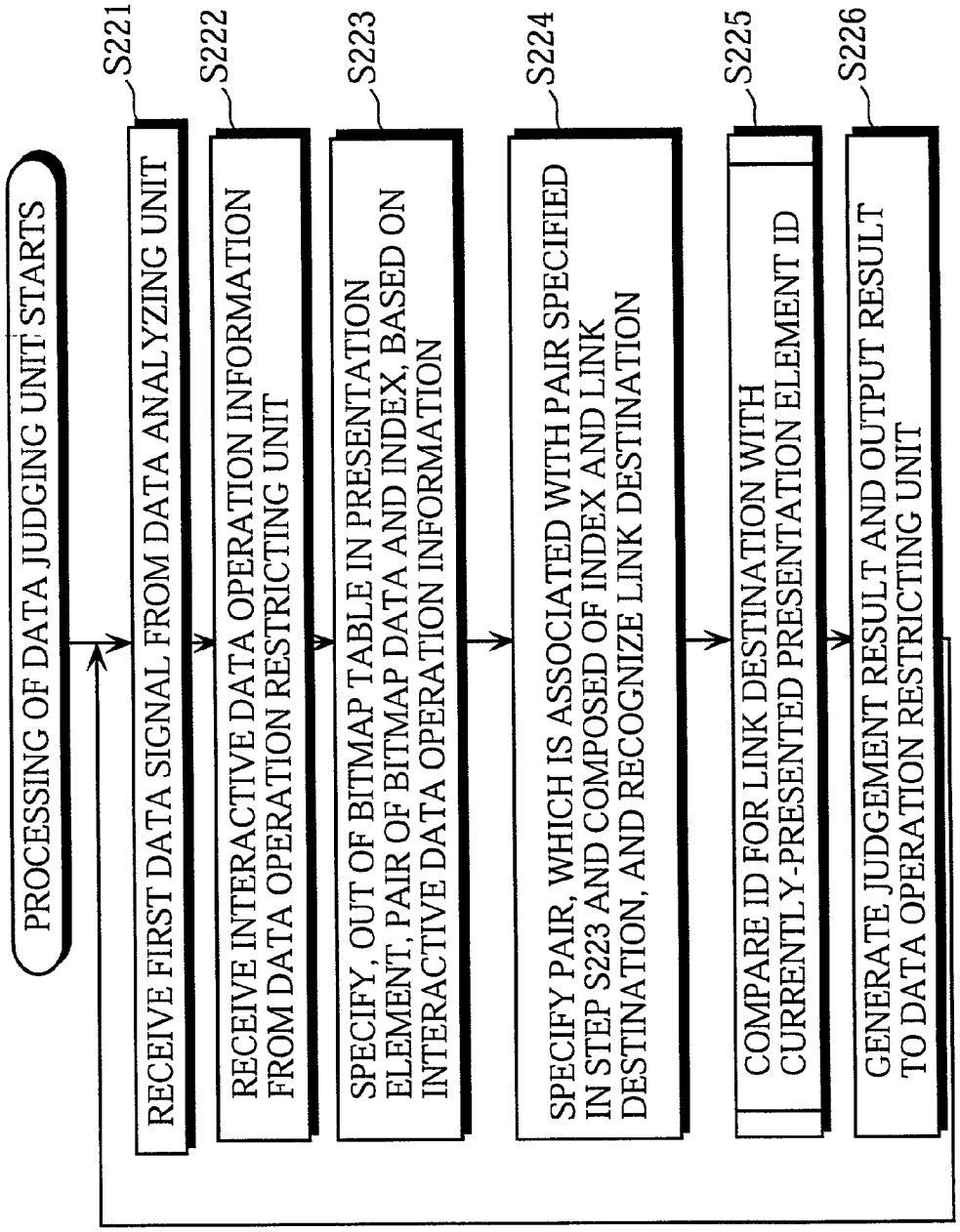
FIG. 12 is a flowchart showing the processing of a data judging unit.
Figure 13:
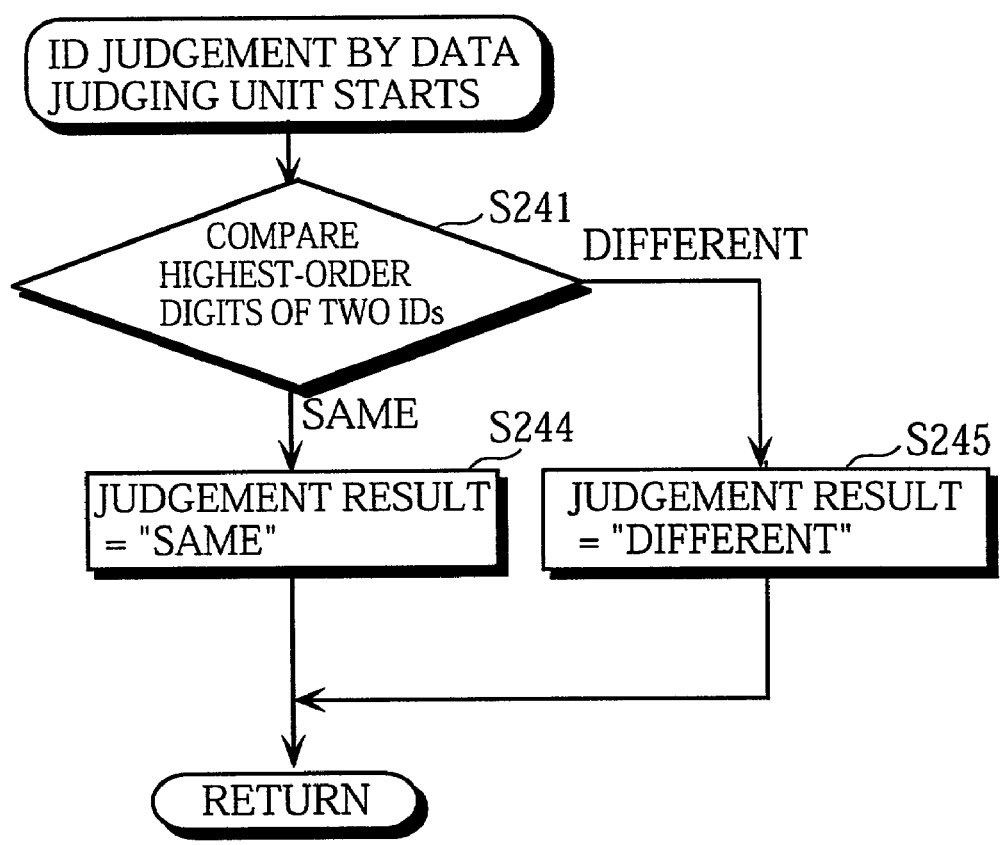
FIG. 13 is a flowchart showing ID (Identification) judgement by the data judging unit.

The following describes the processing of the data judging unit 117 with reference to flowcharts of FIGS. 12 and 13.

The data judging unit 117 receives the first data signal from the data analyzing unit 104 (step S221), and receives the interactive data operation information from the data operation restricting unit 116 (step S222).

The data judging unit 117 then specifies, out of a bitmap table contained in a currently-presented presentation element included in the received first data signal, a pair composed of: (a) bitmap data specified by the received interactive data operation information; and (b) a bitmap index (step S223).

After this, the data judging unit 117 specifies, out of a hyperlink table contained in the above presentation element, a pair which is associated with the pair specified above and composed of a link index and a link destination, and recognizes the link destination (step S244).

The data judging unit 117 then compares the ID of the recognized link destination with the currently-presented presentation element ID to judge whether a presentation element of the link destination and the currently-presented presentation element belong to the same component (step S255).

The data judging unit 117 then outputs the judgement result to the data operation restricting unit 116 (step S226).

The following describes the detailed processing in step S255 with reference to a flowchart of FIG. 13.

The data judging unit 117 judges whether the highest-order digit of the link destination ID and that of the currently-presented presentation element ID are the same (step S241). If so, the data judging unit 117 generates a judgement result shown as "same". If not, the data judging unit 117 generates a judgement result shown as "different" (step S245).

(8) Processing of Data Operation Restricting Unit 116

Figure 14:
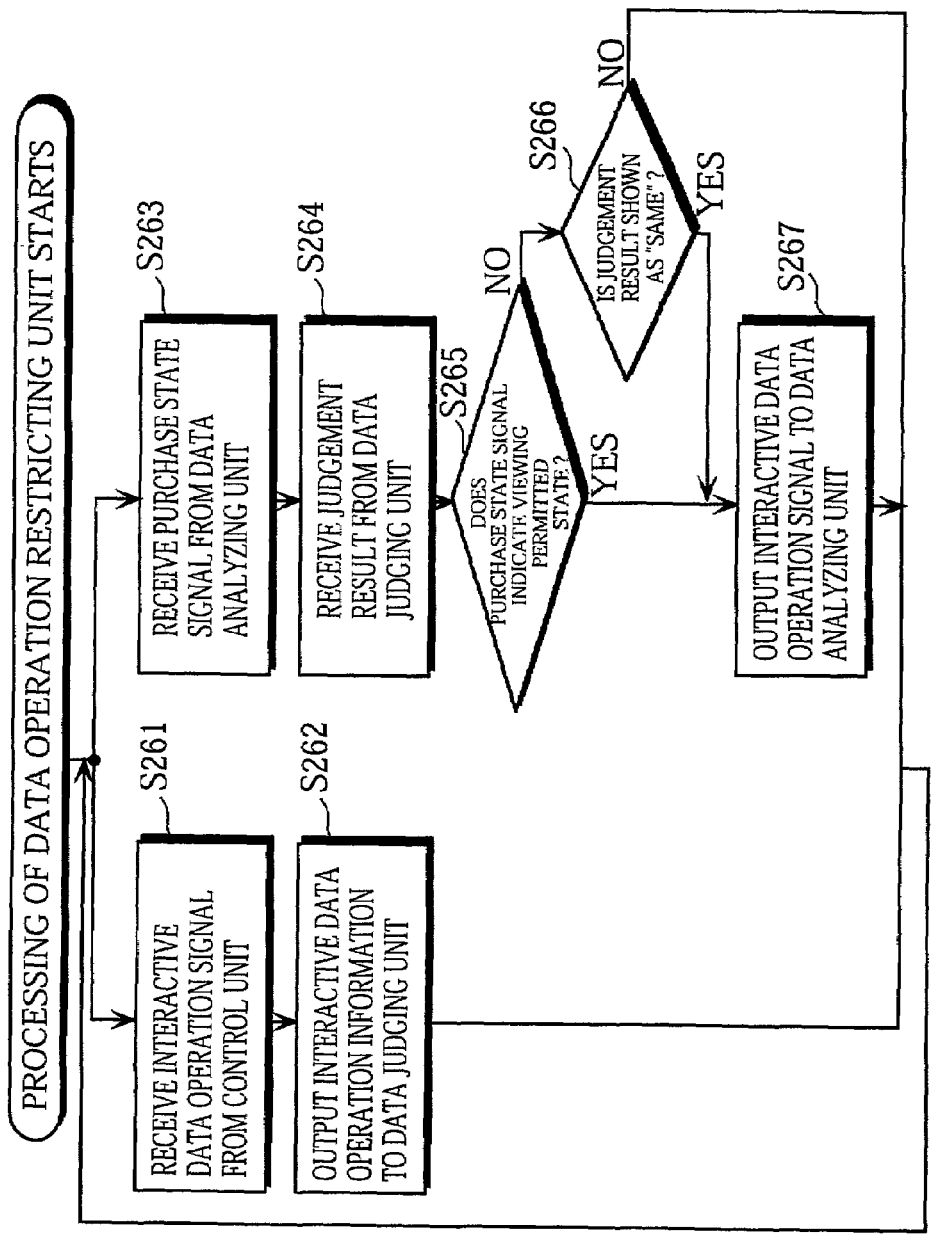
FIG. 14 is a flowchart showing the processing of a data operation restricting unit.

The following describes the processing of the data operation restricting unit 116 with reference to a flowchart of FIG. 14.

The data operation restricting unit 116 receives the interactive data operation signal from the control unit 107 (step S261), and outputs the received interactive data operation signal to the data judging unit 117 as the interactive data operation information (step S262).

The data operation restricting unit 116 receives the purchase state signal from the data analyzing unit 104 (step S263), and receives the judgement result from the data judging unit 117 (step S264). When the received purchase state signal indicates the viewing permitted state (step S265), the data operation restricting unit 116 outputs the received interactive data operation signal to the data analyzing unit 104 (step S267). After this, the control flow returns to either step S261 or step S263.

On the other hand, when the received purchase state signal indicates either the preview state or the viewing prohibited state (step S265) and the received judgement result is shown as "same" (step S266), the data operation restricting unit 116 outputs the interactive data operation signal to the data analyzing unit 104 (step S267). After this, the control flow returns to either step S261 or step S263.

When the judgement result is shown as "different" (step S266), the control flow returns to either step S261 or step S263.

1.3 Considerations

As has been described, the data judging unit 117 refers to a first data signal and interactive data operation information, compares a component that includes currently-presented interactive data with a component that includes interactive data corresponding to a hyperlink destination, and generates a judgement result. The data judging unit 117 then outputs the generated judgment result to the data operation restricting unit 116. When the judgement result shows that the above two components are not the same, the data operation restricting unit 116 does not output the received interactive data operation signal to prohibit a link to the above hyperlink destination.

The link to this hyperlink destination is performed unless the purchase state signal indicates the viewing prohibited state or the preview state, i.e., if the purchase state signal indicates the viewing permitted state. When the purchase state signal indicates the viewing prohibited state or the preview state, the data judging unit 117 makes the above judgement, and the link to the hyperlink destination is performed if the two components are the same. If the two components are different, this link is ignored.

For instance, if currently-presented interactive data is the presentation element 213 in FIG. 2 and the user clicks on "TO WEATHER FORECAST", a link to the presentation element 206, which is included in the same component as that including hyperlink data "TO WETHER FORECAST", is performed. A link to the presentation element 215 in a different component, however, is ignored.

In this way, the interactive data receiving device 100 restricts a link destination within a component that includes interactive data presented first.

2. Example Modifications

The present invention has been described using the above embodiment. It should be clear, however, that the present invention is not limited to the above embodiment. The following describes example modifications, mainly modifications to data analysis, data presentation, and user-operation restrictions performed by the data analyzing unit 104, the data presentation restricting unit 115, and the data operation restricting unit 116.

(1) Restricting Link Destination to Firstly-Presented Reception Element

Figure 15:
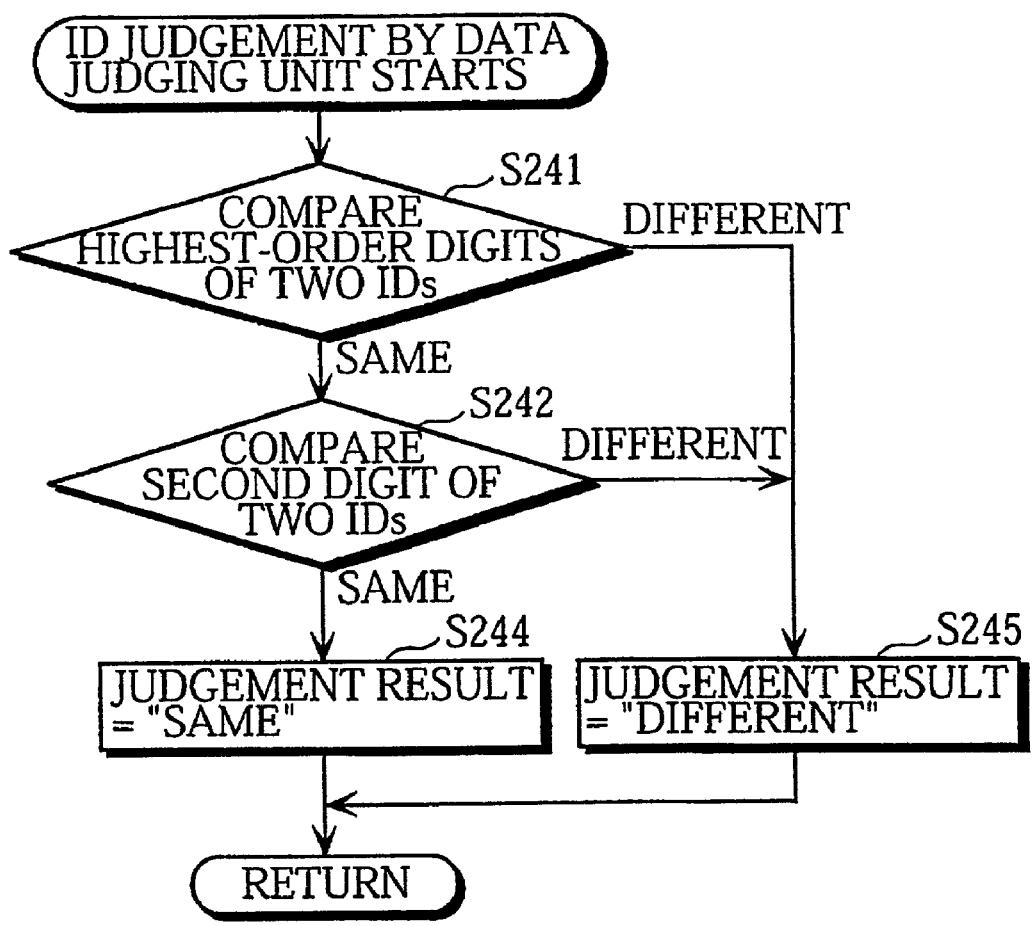
FIG. 15 is a flowchart showing modification ID judgement by the data judging unit.

The following describes an example modification to step S225 in FIG. 12 with reference to a flowchart of FIG. 15.

The data judging unit 117 judges whether the highest-order digit of the link destination presentation element ID and that of the currently-presented presentation element ID are the same (step S241) and, if so, further judges if the second-order digit of the link destination ID and that of the currently-presented presentation element ID are the same (step S242). If so, the data judging unit 117 generates a judgement result shown as "same" (step S244). If not, the data judging unit 117 generates a judgement result shown as "different" (step S245).

In this way, the data judging unit 117 refers to the first data signal and the interactive data operation information, and compares a reception element including currently-presented interactive data with a reception element including interactive data that is a link destination of hyperlink data. The data judging unit 117 then generates and outputs a judgement result to the data operation restricting unit 116. When the judgement result is shown as "different", the data operation restricting unit 116 does not output the received interactive data operation signal so that a link designated by the interactive data operation signal is prohibited.

For instance, when the presentation element 206 shown in FIG. 2 is now presented and a user clicks on "TO NEWS", the link 212 to the presentation element 213 is performed. On the other hand, if the user clicks on "TOKYO" or "OSAKA", the link 210 to the presentation element 208, or the link 211 to the presentation element 209, respectively, is ignored.

(2) Restricting Link Destination to Firstly-Presented Presentation Element

Figure 16:
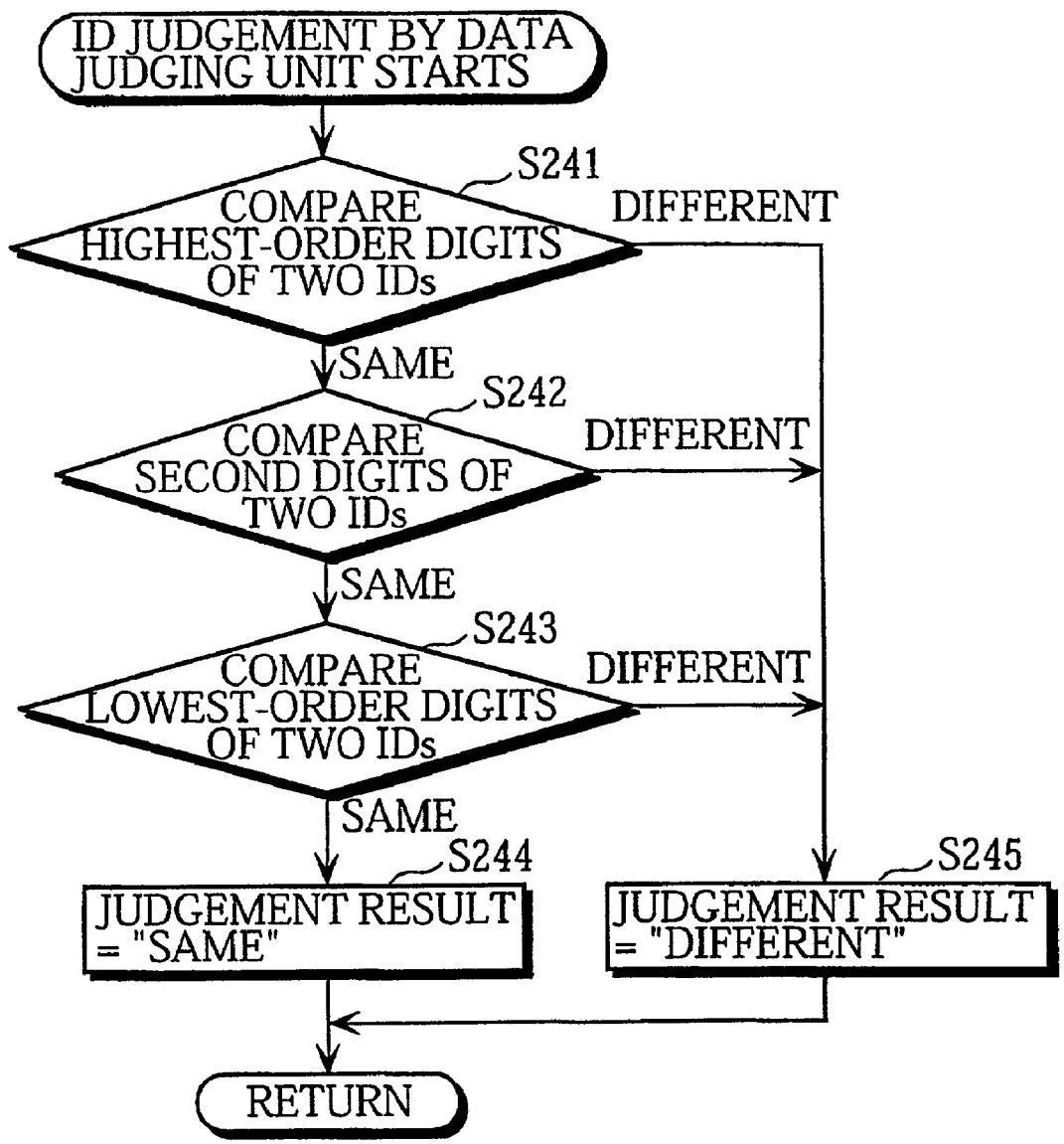
FIG. 16 is a flowchart showing another modification ID judgement by the data judging unit.

The following describes another example modification to step S225 in FIG. 12 with reference to a flowchart of FIG. 16.

The data judging unit 117 judges whether the highest-order digit of the link destination presentation element ID and that of the currently-presented presentation element ID are the same (step S241). If so, the data judging unit 117 further judges if the second-order digit of the link destination ID and that of the currently-presented presentation element ID are the same (step S242). If so, the data judging unit 117 further judges whether the lowest-order digits of the two IDs are the same (step S243). If so, the data judging unit 117 generates a judgement result shown as "same" (step S244). When giving the "no" judgement in step S241 or step S242, the data judging unit 117 generates a judgement result shown as "different" (step S245).

In this way, the data judging unit 117 refers to the first data signal and the interactive data operation information, and compares a presentation element including currently-presented interactive data with a presentation element including interactive data that is a link destination of hyperlink data. The data judging unit 117 then generates and outputs a judgement result to the data operation restricting unit 116.

When the judgement result indicates that the two presentation elements are different, the data operation restricting unit 116 does not output a received interactive data operation signal so that a link designated by the interactive data operation signal is prohibited.

For instance, when the presentation element 206 is now presented and a user clicks on "OSAKA", "TOKYO", or "TO NEWS", the link 210 to the presentation element 208, the link 211 to the presentation element 209, or the link 212 to the presentation element 213, respectively, is ignored.

(3) Restriction Placed by Script on Presentation and Operation of Interactive Data ①

The sending device 20 transmits a TS including a presentation element that contains a script as shown in FIG. 17. The receiving unit 101 in the interactive data receiving device 100 receives this TS, and the restoring unit 103 outputs a first data signal that is interactive data including the above presentation element that contains the script to the data presentation restricting unit 115, which then outputs this first data signal to the data analyzing unit 104.

The script shown in FIG. 17 contains a value shown as "PRESENTATION ELEMENT 1" on the second line. This value is variable, like an argument of a function. For instance, if this script is included in the presentation element 208, this value "PRESENTATION ELEMENT 1" is replaced by a value indicating a presentation element ID of the presentation element 206. If this script is included in the presentation element 206, this value is replaced by a value indicating a presentation element ID of the presentation element 213.

Figure 18:
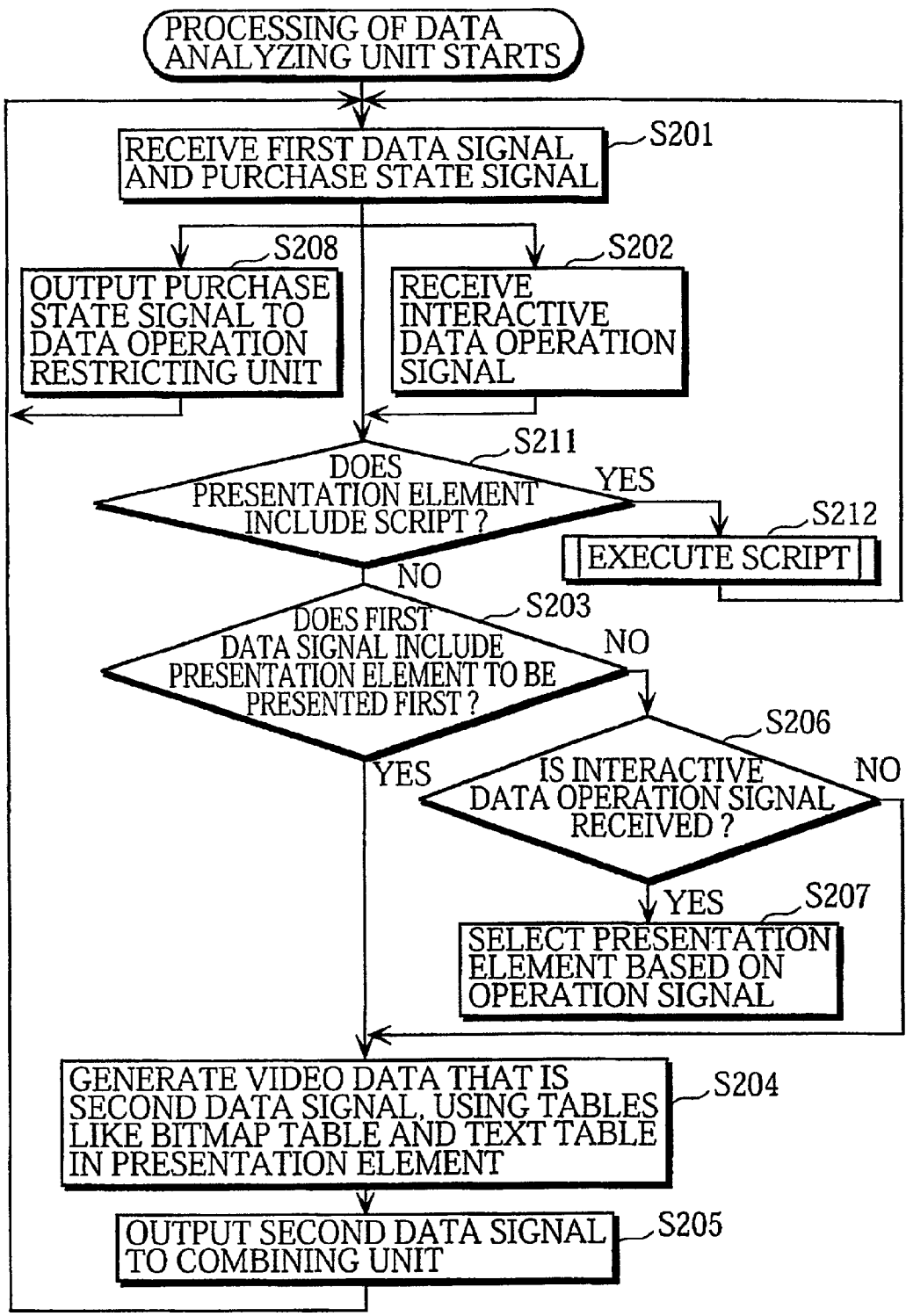
FIG. 18 is a flowchart showing modification processing of the data analyzing unit.

The following describes the processing of the data analyzing unit 104 with reference to a flowchart of FIG. 18.

With this flowchart, in a step having the same reference number as a step in FIG. 11, the same operation as shown in the step in FIG. 11 is performed. The following description focuses on operations unique to the flowchart of FIG. 18.

After step S201 or step S202, the data analyzing unit 104 judges if a presentation element that should be firstly presented or that is specified by the received interactive data operation signal includes a script (step S211). If so, the data analyzing unit 104 executes this script (step S212), and the control flow returns to step S201, so that the processing is repeated.

Figure 19:
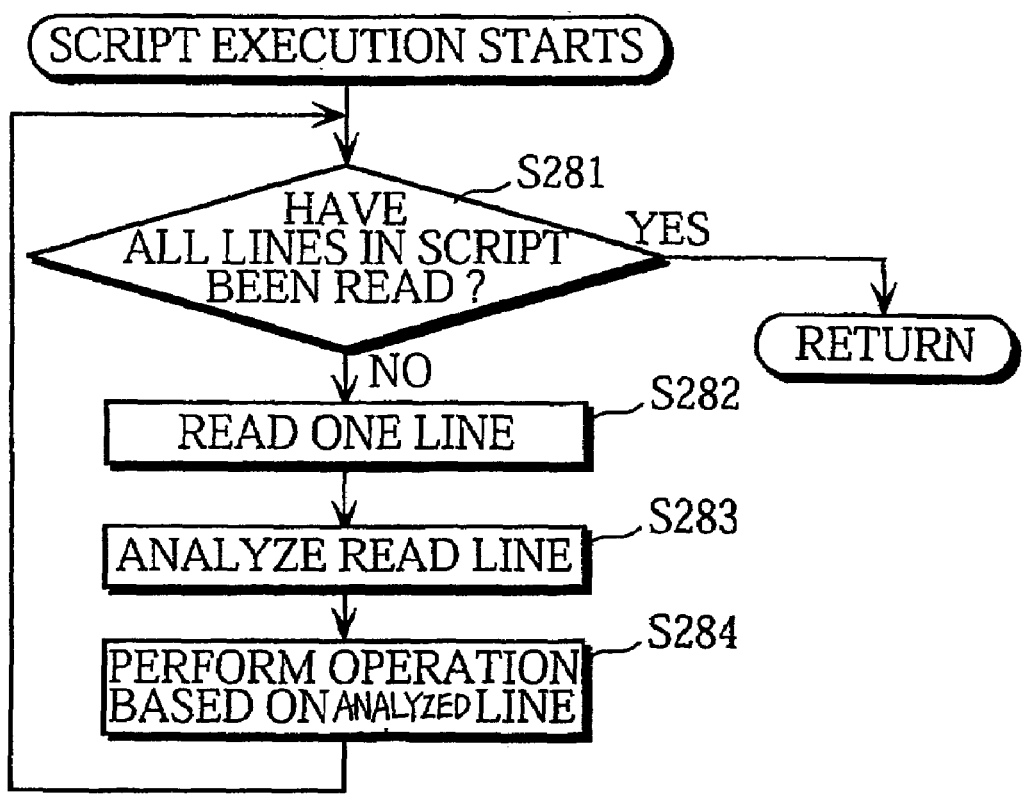
FIG. 19 is a flowchart showing the processing to analyze and execute a script.

The following describes the processing of step S212 in detail with reference to a flowchart of FIG. 19.

The data analyzing unit 104 judges whether all the lines in a script have been read (step S281). If not, the data analyzing unit 104 reads a line from the script (step S282), analyzes the read line (step S283), and performs operations in accordance with an analysis result (step S284). When all the lines have been read (step S281), the processing is terminated.

Figure 20:
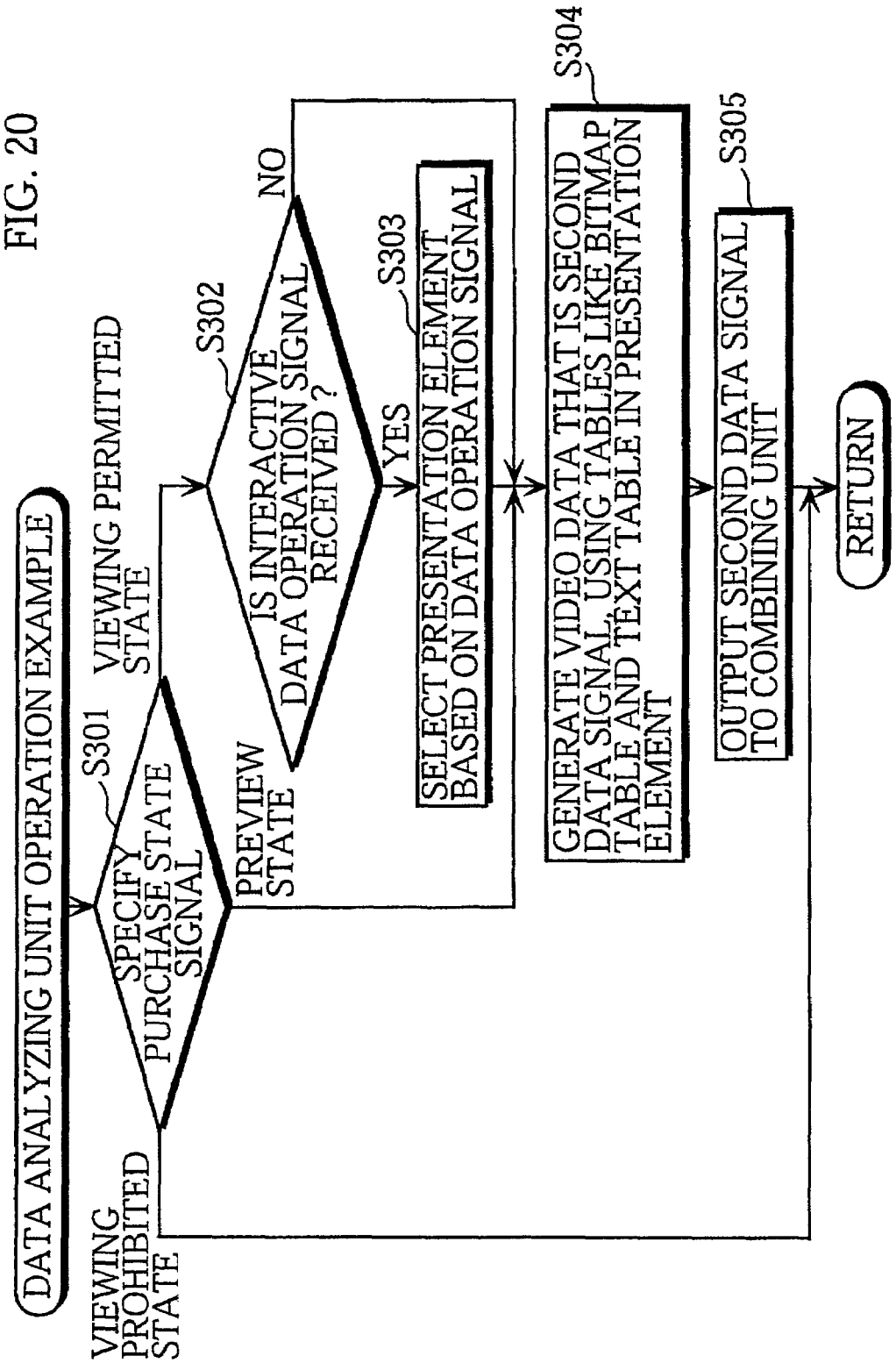
FIG. 20 is a flowchart showing example processing by the data analyzing unit to execute a script.

When executing the script shown in FIG. 17, the data analyzing unit 104 operates as shown in a flowchart of FIG. 20.

When the purchase state signal indicates the viewing permitted state (step S301) and the interactive data operation signal has been received (step S302), the data analyzing unit 104 selects a presentation element in accordance with the received interactive data operation signal (step S303). Following this, the data analyzing unit 104 generates video data, which is a second data signal, referring to a bitmap table, a text table, and the like included in the selected presentation element (step S304), and outputs the generated second data signal to the combining unit 106 (step S305). The processing is then completed.

When the purchase state signal indicates the preview state (step S301), the data analyzing unit 104 generates video data, which is a second data signal, referring to a bitmap table, a text table, and the like included in a firstly-presented presentation element (step S304), and outputs the generated second data signal to the combining unit 106 (step S305). The processing is then completed.

When the purchase state signal indicates the viewing prohibited state (step S301), the data analyzing unit 104 shortly completes the processing.

(4) Restriction Placed by Script on Presentation and Operation of Interactive Data ②

In this modification example, the interactive data receiving device 100 has a script area for storing a script. This script area is composed of semiconductor memory, and is left blank to represent an initial value.

Note that this script area may alternatively store the script shown in FIG. 17 as the initial value, or the interactive data receiving device 100 may receive an initial script as the initial value via a broadcast wave, and the script area may store this initial value.

The sending device 20 broadcasts a TS including a presentation element containing a script as shown in FIG. 21. The script shown in the figure contains: (a) an update instruction to have an instruction registered; and (b) the instruction to be registered. This update instruction may alternatively be an instruction to change, add, or delete an instruction. The receiving unit 101 in the interactive data receiving device 100 receives this TS, and the restoring unit 103 outputs a first data signal that is interactive data including the above presentation element that contains the above script to the data presentation restricting unit 115, which then outputs this first data signal to the data analyzing unit 104. The data analyzing unit 104 then analyzes the update instruction in the script, and if the update instruction indicates that an instruction should be registered, changed, added, or deleted, the data analyzing unit 104 registers, makes a change to the instruction, or adds the instruction to or deletes the instruction from the script area. After this, the data analyzing unit 104 executes the instruction included in the script.

The following specifically describes this processing. The data analyzing unit 104 performs the processing similar to that shown in the flowchart of FIG. 18. Operations unique to this example modification are described below with reference to a flowchart of FIG. 22.

Figure 22:
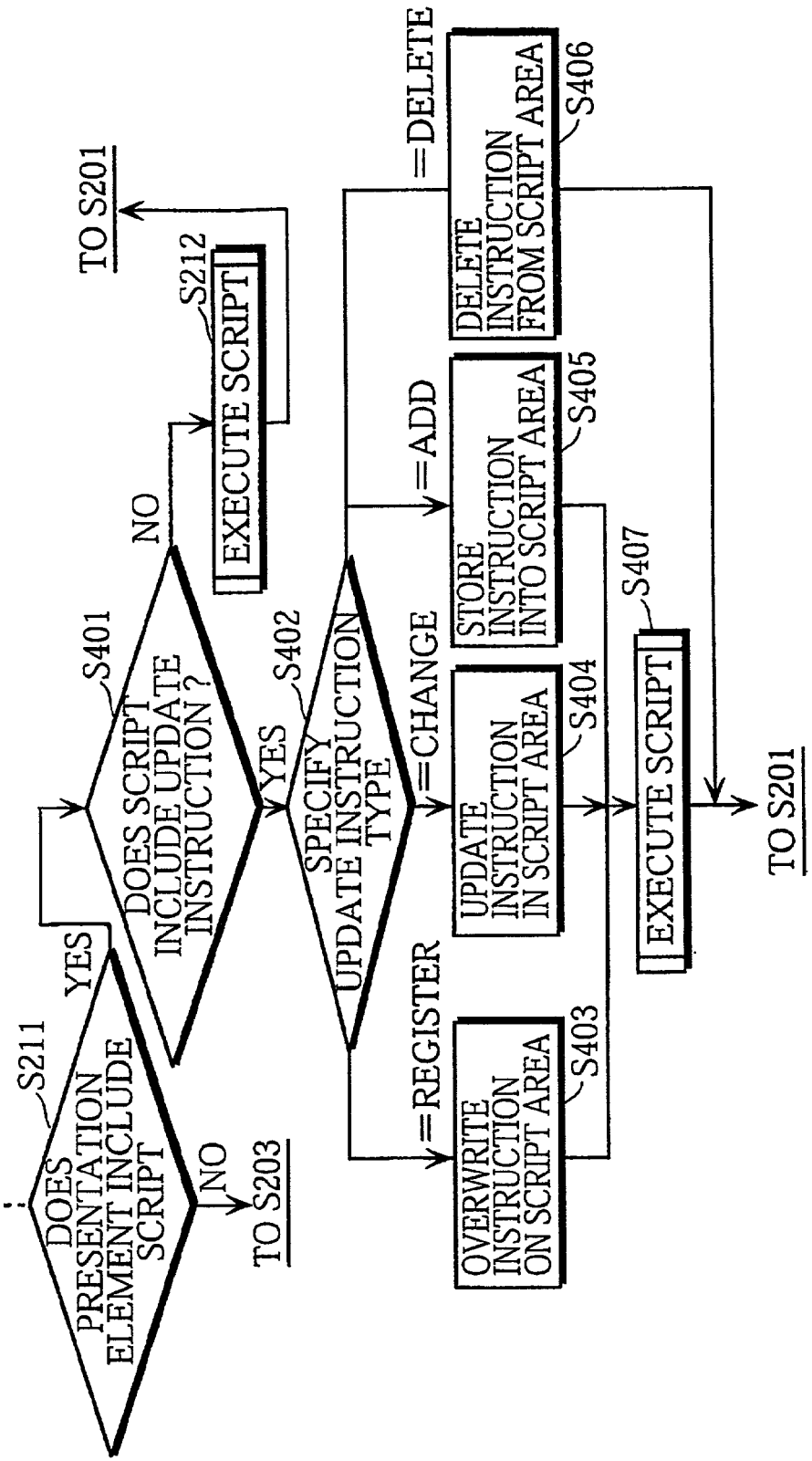
FIG. 22 is a flowchart showing another processing by the data analyzing unit.

The data analyzing unit 104 judges if a presentation element that should be firstly presented or that is specified by the received interactive data operation signal includes a script in step S211 in FIG. 18, which is equal to step S211 in FIG. 22. If so, the data analyzing unit 104 further judges if this script contains an update instruction (step S401). If not, the data analyzing unit 104 executes the script (step S212), and the control flow returns to step S201. When judging that the script contains an update instruction (step S401) and that the contained update instruction is to register an instruction contained in the script (step S402), the data analyzing unit 104 overwrites this instruction onto an instruction stored in the script area (step S403) and executes the script (step S407). The control flow then returns to step S201.

When judging that the update instruction is to make a change to an instruction (step S402), the data analyzing unit 104 updates the instruction, which is stored in the script area (step S404), and executes the script (step S407). The control flow then returns to step S201.

When judging that the update instruction is to add an instruction (step S402), the data analyzing unit 104 registers the instruction in the script into the script area (step S405), and executes the script (step S407). The control flow then returns to step S201.

When judging that the update instruction is to delete an instruction (step S402), the data analyzing unit 104 deletes the instruction specified in the script from the script area (step S404), and executes the script (step S407). The control flow then returns to step S201.

Figure 23:
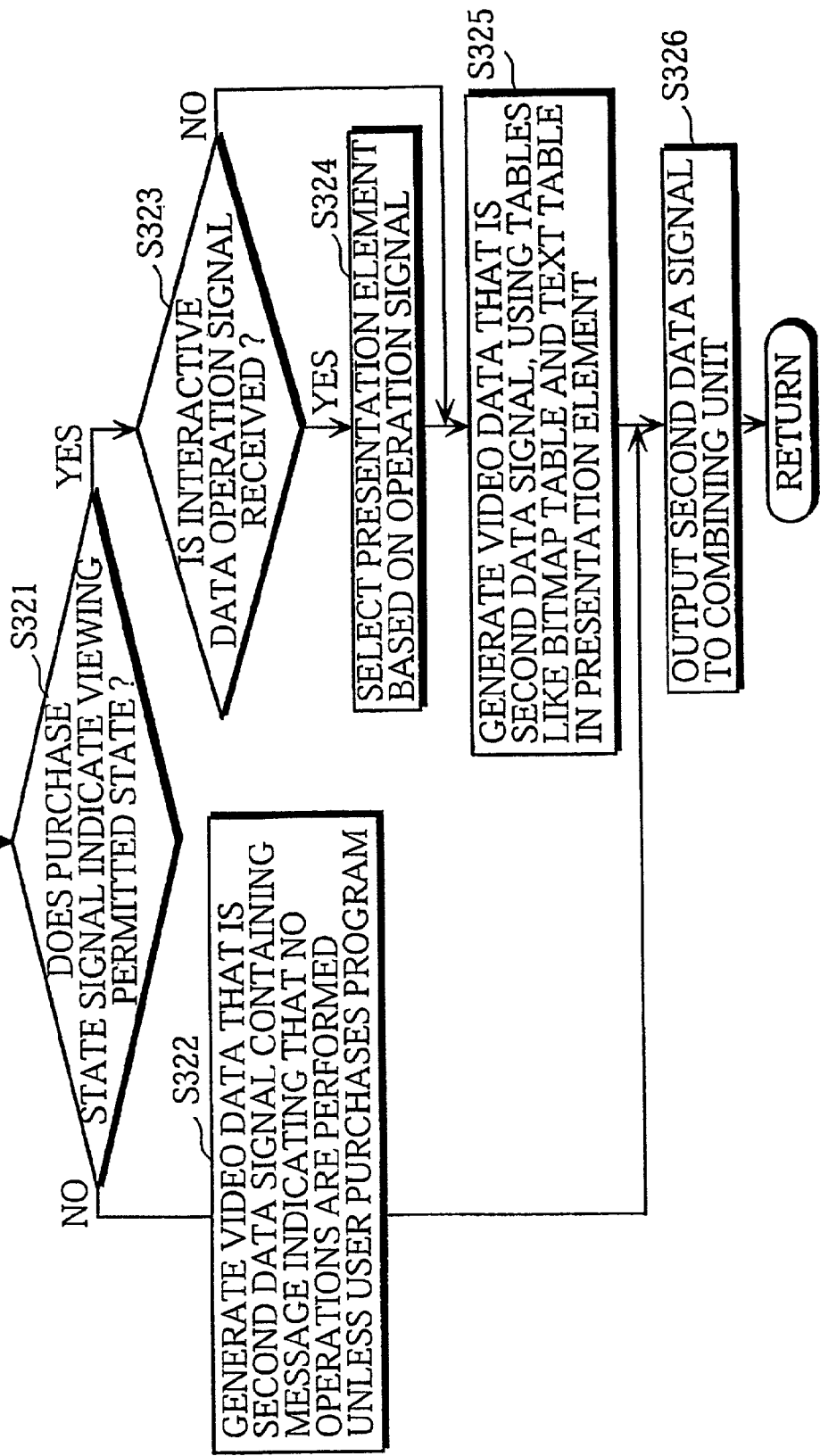
FIG. 23 is a flowchart showing another processing by the data analyzing unit.

For instance, when executing the script shown in FIG. 21, the data analyzing unit 104 performs, in step S407 in FIG. 22, the processing shown in a flowchart of FIG. 23.

When judging that the purchase state signal indicates the viewing permitted state (step S321) and when receiving the interactive data operation signal (step S323), the data analyzing unit 104 selects a presentation element in accordance with the received interactive data operation signal (step S324). The data analyzing unit 104 then generates video data, which is a first data signal, using a bitmap table, a text table, and the like (step S325), outputs the generated first data signal to the combining unit 106 (step S326), and completes the processing.

On the other hand, when judging that the purchase state signal is either the preview state or the viewing prohibited state (step S321), the data analyzing unit 104 generates a second data signal containing a message indicating that no operations are performed unless the user purchases a program (step S322), and outputs the generated second data signal to the combining unit 106 (step S326). This completes the processing of the flowchart.

In this way, when a script contains an instruction to perform a link via hypertext data (hereafter, such instruction is called a "hyperlink instruction"), this link is performed only when the purchase state signal indicates the viewing permitted state. When the purchase state signal indicates the viewing prohibited state or the preview state, the link is not performed, and a message indicating a reason for the unperformed link is presented to the user instead.

(5) Restrictions Placed by Viewing Enabled Signal Assigned to Presentation Element or Reception Element on Interactive Data Presentation and Operation In this example modification, the sending device 20 transmits a TS including a presentation element that contains a viewing enabled signal as shown in FIG. 24. The viewing enabled signal indicates either the preview state or the viewing permitted state.

The receiving unit 101 in the interactive data receiving device 100 receives the above TS, and the restoring unit 103 outputs, as a first data signal, interactive data including the above presentation element containing the above viewing enabled signal to the data presentation restricting unit 115. The data presentation restricting unit 115 then outputs this first data signal to the data analyzing unit 104. The data analyzing unit 104 then judges that the above presentation element contains the viewing enabled signal, extracts the viewing enabled signal from the presentation element, and outputs the extracted viewing enabled signal to the data operation restricting unit 116.

Note that the above viewing enabled signal may be alternatively contained in a reception element, instead of a presentation element.

Figure 25:
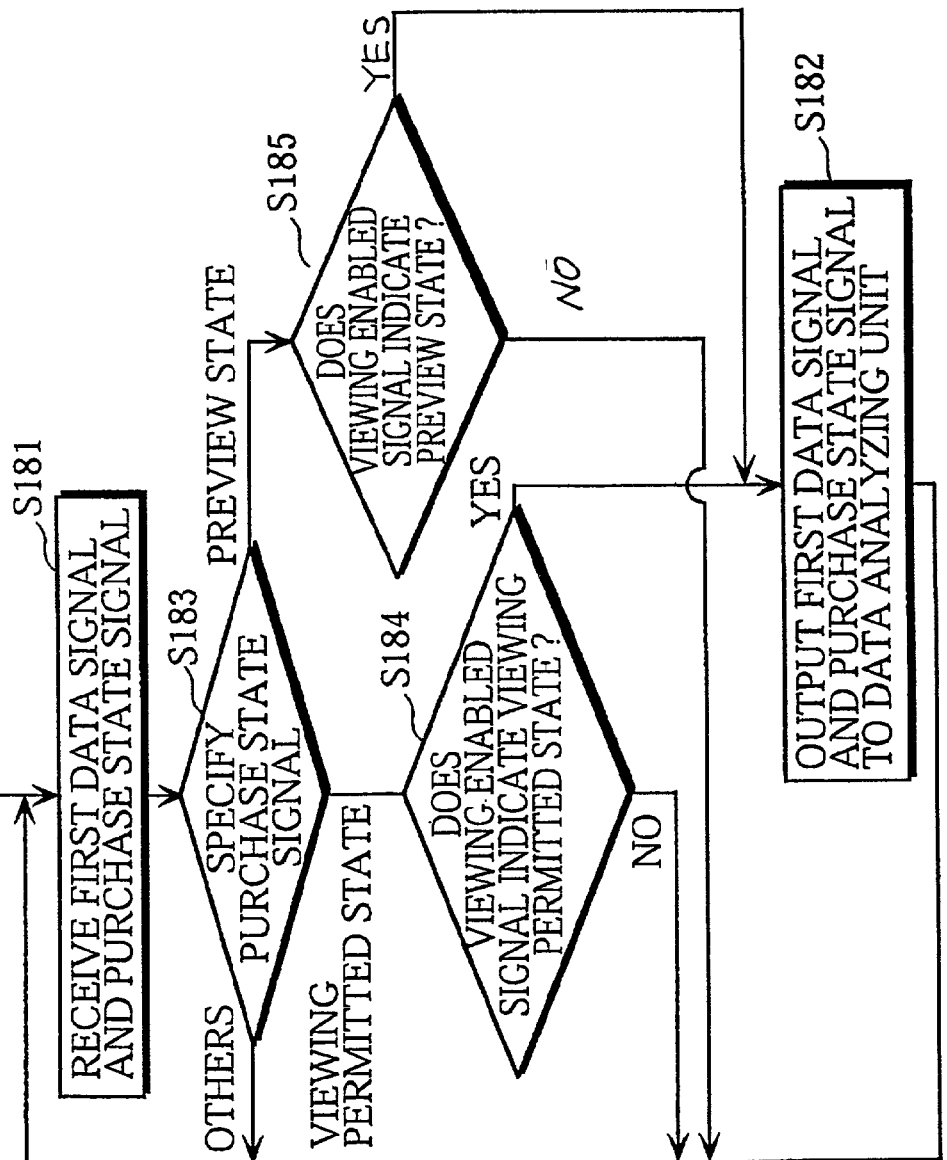
FIG. 25 is a flowchart showing another processing by the data presentation restricting unit.

The following described the processing of the data presentation restricting unit 115 of the present modification with reference to a flowchart of FIG. 25.

The data presentation restricting unit 115 receives the first data signal and the purchase state signal from the restoring unit 103 (step S181).

When the received purchase state signal indicates the viewing permitted state (step S183) and the viewing enabled signal also indicates the viewing permitted state (step S184), the data presentation restricting unit 115 outputs the received first data signal and purchase state signal to the data analyzing unit 104 (step S182), and the control flow returns to step S181. When the viewing enabled signal does not indicate the viewing permitted state (step S184), the control flow returns to step S181.

On the other hand, when the received purchase state signal indicates the preview state (step S183) and the viewing enabled signal also indicates the preview state (step S185), the data presentation restricting unit 115 outputs the received first data signal and purchase state signal to the data analyzing unit 104 (step S182), and the control flow returns to step S181. If the viewing enabled signal does not indicate the preview state (step S185), the control flow returns to step S181.

When the purchase state signal indicates neither the preview state nor the viewing permitted state (step S183), the control flow returns to step S181.

As is described above, a viewing enabled signal indicating either the preview state or the viewing permitted state is assigned to a presentation element or a reception element in advance. The data presentation restricting unit 115 then specifies interactive data in accordance with the purchase state signal and the viewing enabled signal, and permits presentation of the specified interactive data only.

Figure 26:
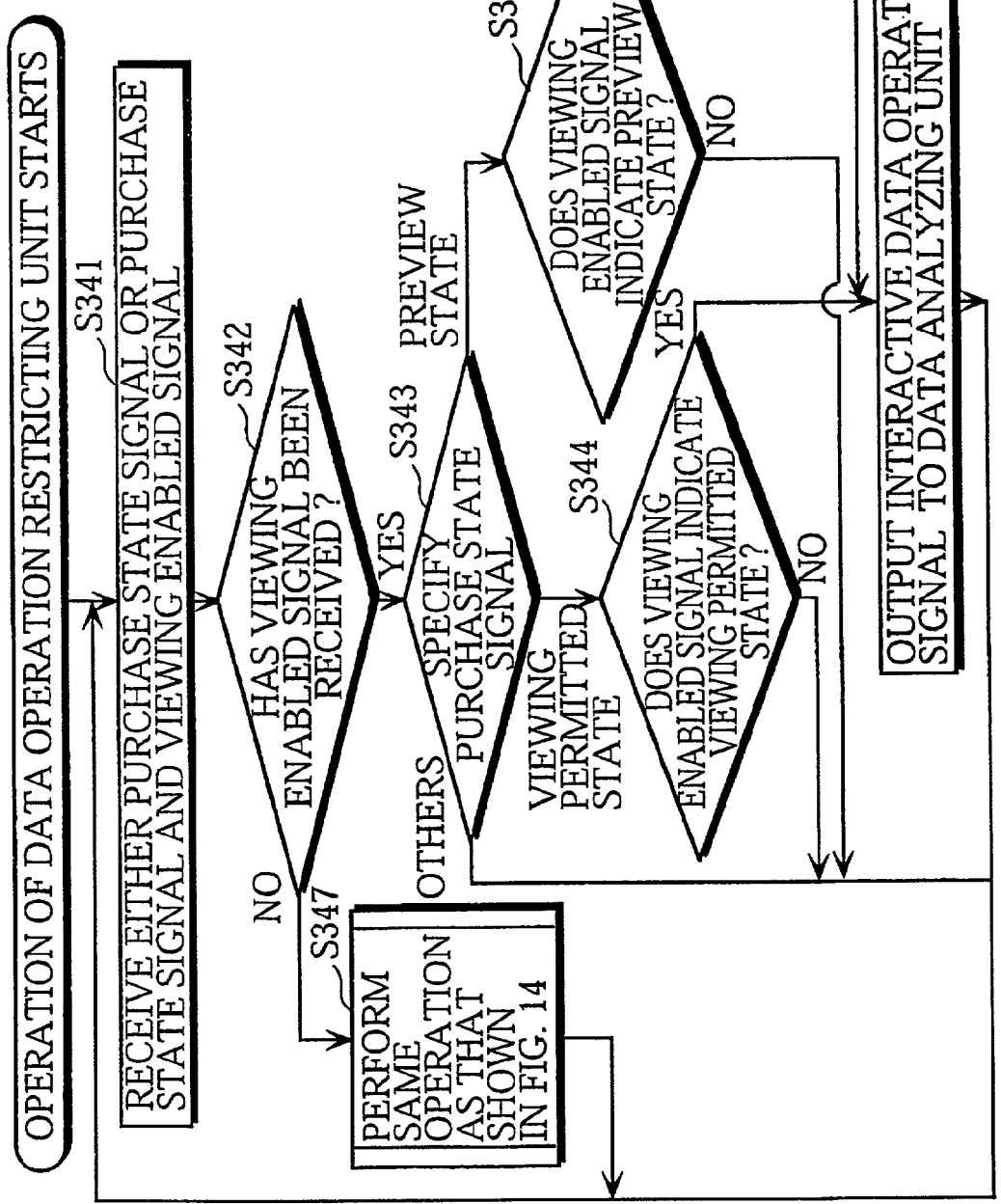
FIG. 26 is a flowchart showing another processing by the data operation restricting unit.

After the above processing, the data operation restricting unit 116 operates as shown in a flowchart of FIG. 26.

The data operation restricting unit 116 receives either: the purchase state signal and the viewing enabled signal; or only the purchase state signal (step S341). When judging that the viewing enabled signal has not been received (step S342), the data operation restricting unit 116 performs the same processing as that shown in the flowchart of FIG. 14 (step S347). The control flow then returns to step S341.

On the other hand, when the data operation restricting unit 116 judges that the viewing enabled signal has been received (step S342) and when the purchase state signal indicates the preview state (step S343), the data operation restricting unit 116 further judges if the received viewing enabled signal also indicates the preview state (step S345). If so, the data operation restricting unit 116 outputs the received interactive data operation signal to the data analyzing unit 104 (step S346), and the control flow returns to step S341. When the viewing enabled signal does not indicate the preview state (step S345), the control flow returns to step S341.

When the purchase state signal indicates the viewing permitted state (step S343) and the viewing enabled signal also indicates the viewing permitted state (step S344), the data operation restricting unit 116 outputs the interactive data operation signal to the data analyzing unit 104 (step S346), and the control flow returns to step S341. When the viewing enabled signal does not indicate the viewing permitted state (step S344), the control flow returns to step S341.

When the purchase state signal indicates neither the preview state nor the viewing permitted state (step S343), the control flow returns to step S341.

In some cases, a broadcasted component includes directory information that describes constructions of presentation elements and reception elements included in this component. The above viewing enabled signal may be contained in such directory information.

(6) Restriction on Number of Interactive Data Operations

The data operation restricting unit 116 counts a number of operations performed by the user on interactive data, based on an interactive data operation signal. When the counted number of operations reaches a predetermined number, for instance, fifty or higher, the data operation restricting unit 116 ignores the above interactive data operation signal.

Figure 27:
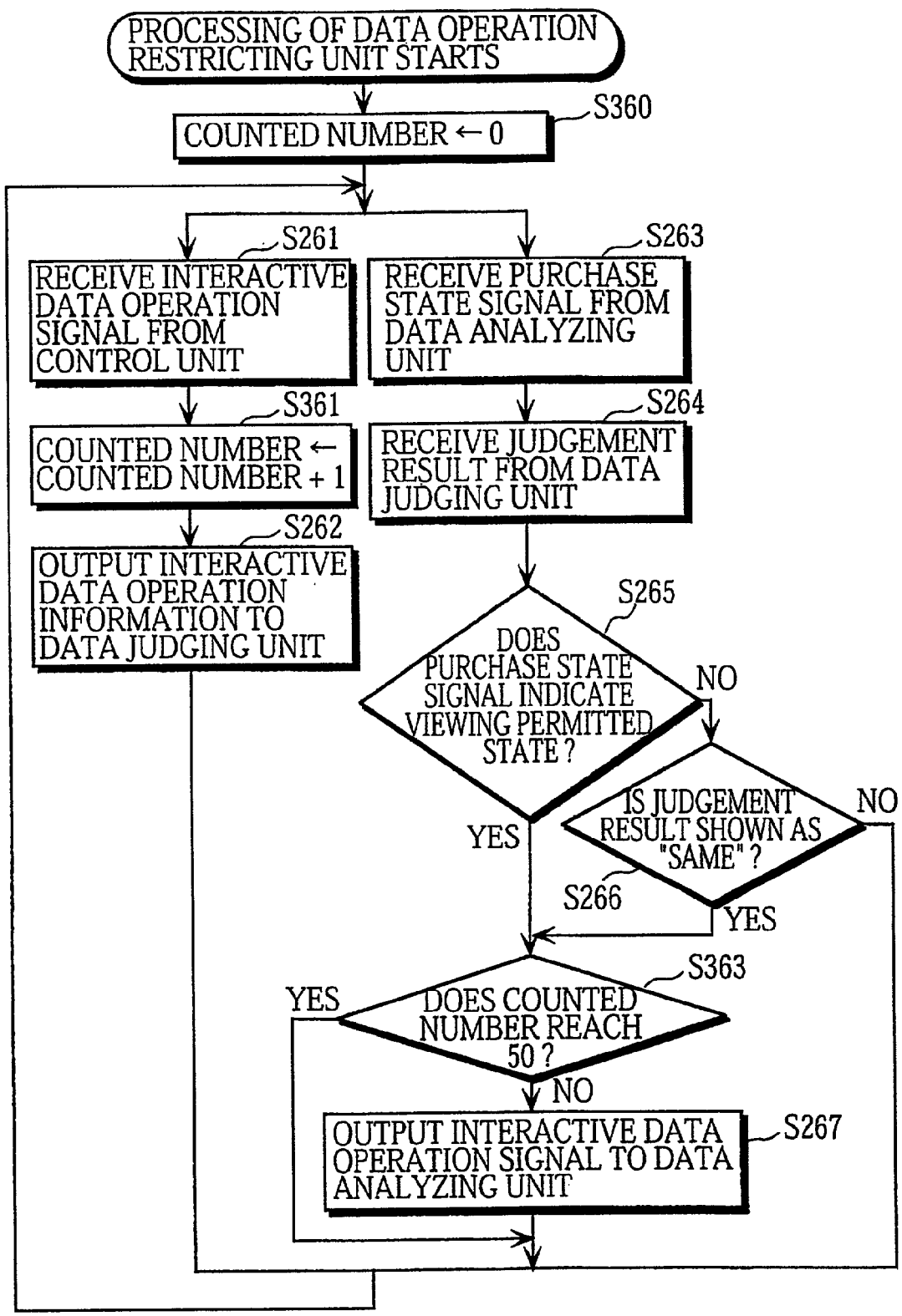
FIG. 27 is a flowchart showing another processing by the data operation restricting unit.

The following describes the processing of the data operation restricting unit 116 with reference to a flowchart of FIG. 27. This processing is basically the same as that shown in FIG. 14, and therefore explanation below focuses on steps unique to FIG. 27. These steps are assigned reference numbers that are different from those in FIG. 14.

As soon as the processing starts, the data operation restricting unit 116 initializes a counted number by substituting zero into the counted number (step S360). This initialization in step S360 may be performed, for instance, as soon as a user selects a viewing of a program for the first time.

Immediately after step S261, the data operation restricting unit 116 increments the counted number by one (step S361).

Immediately before step S267, the data operation restricting unit 116 compares the counted number with the number "50" to judge whether the counted number reaches the number "50" (step S363). If so, the control flow returns to either step S261 or step S263. If not, the control flow moves to step S267.

(7) Restriction Placed on Interactive Data Presentation when Purchase State Signal Indicates Preview State or Viewing Prohibited State The data presentation restricting unit 115 prohibits interactive data from being presented to the user when judging that the purchase state signal sent from the restoring unit 103 indicates the preview state or the viewing prohibited state.

Figure 28:
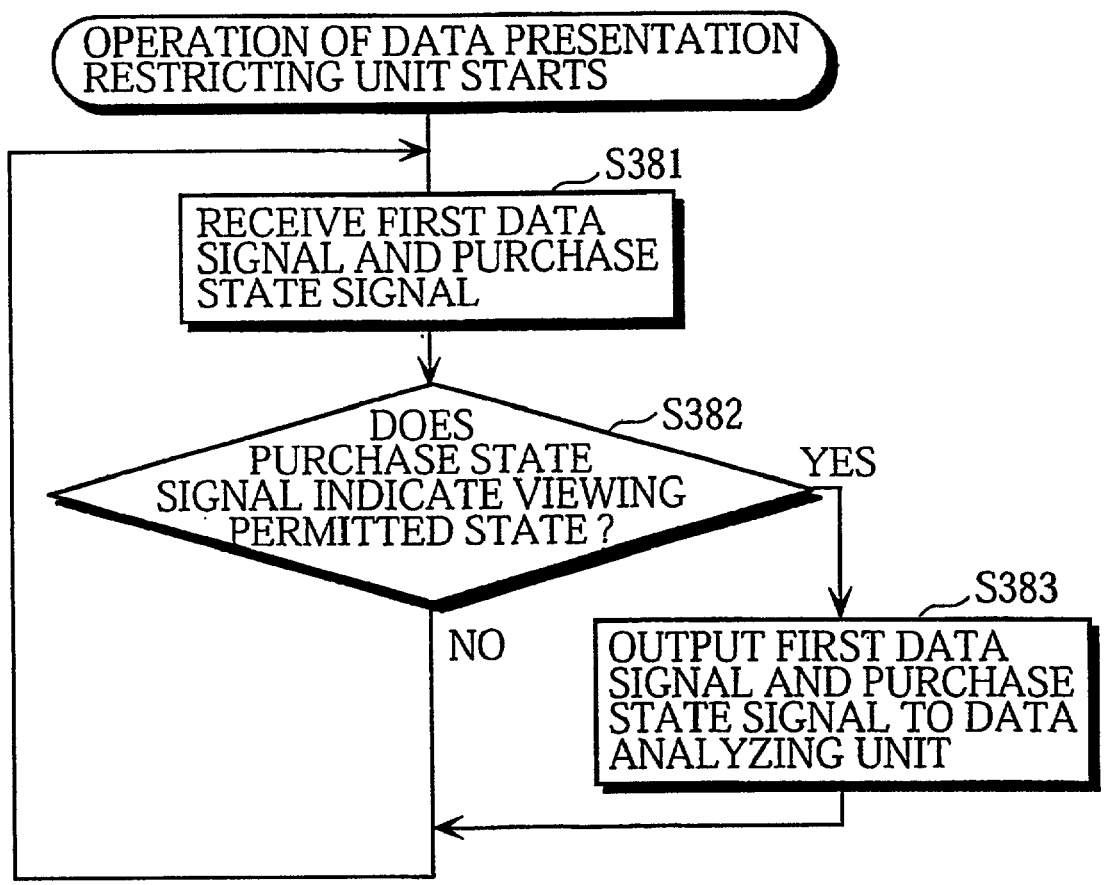
FIG. 28 is a flowchart showing another processing by the data presentation restricting unit.

The following describes this processing with reference to a flowchart of FIG. 28.

The data presentation restricting unit 115 receives the first data signal and the purchase state signal from the restoring unit 103 (step S381).

Following this, the data presentation restricting unit 115 judges whether the received purchase state signal indicates the viewing permitted state (step S382). If so, the data presentation restricting unit 115 outputs the first data signal and the purchase state signal to the data analyzing unit 104 (step S383), and the control flow returns to step S381. The processing is then repeated.

When the data presentation restricting unit 115 judges that the received purchase state signal does not indicate the viewing permitted state (step S382), the control flow returns to step S381, and the processing is repeated.

(8) Restriction Placed on User Operations for Interactive Data when Purchase State Signal Indicates Preview State or Viewing Prohibited State The data operation restricting unit 116 receives the purchase state signal from the data analyzing unit 104. When this purchase state signal indicates the preview state or the viewing prohibited state, the data operation restricting unit 116 ignores an interactive data operation signal which it has received.

Figure 29:
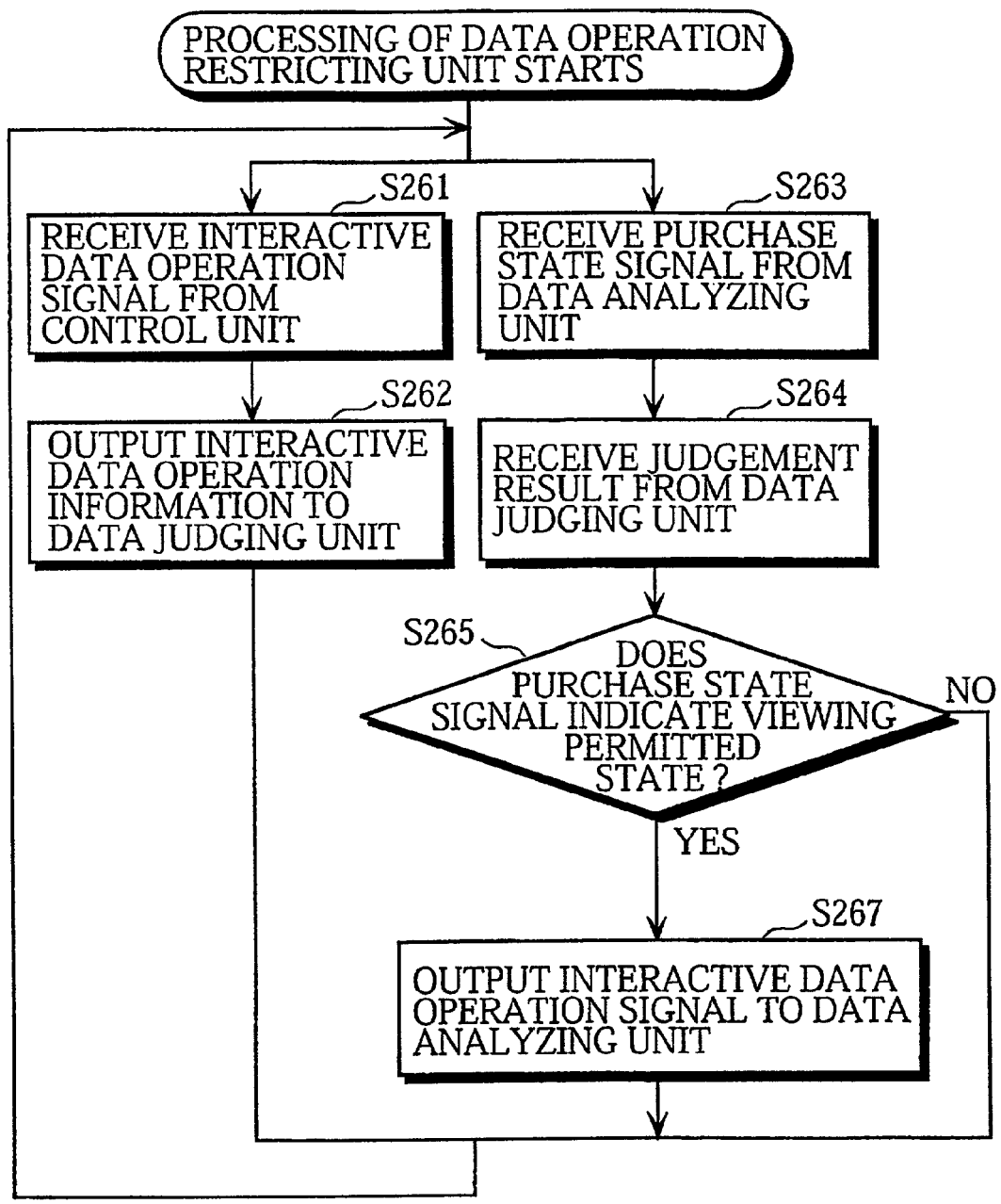
FIG. 29 is a flowchart showing another processing by the data operation restricting unit.

The following describes this processing with reference to a flowchart of FIG. 29. This flowchart is the same as that of FIG. 14, except that the flowchart of FIG. 29 does not contain step S266.

As shown in the flowchart, when the data operation restricting unit 116 judges that the purchase state signal does not indicate the viewing permitted state (step S265), the control flow returns to either step S261 or step S263. The processing is then repeated.

(9) Other Modifications

The present invention may be a method that achieves the processing as described above. The present invention may also be a computer program that has a computer achieve this method, or digital signals for this computer program.

The present invention may be the above computer program or digital signals recorded on a computer-readable recording medium, such as a floppy disc, hard disk, a CD-ROM (read only memory), a magneto-optical disc (MO), a DVD (digital versatile disc), a DVD-ROM, a DVD-RAM, and semiconductor memory.

For the present invention, the above computer program or the digital signals may be transmitted via a network, which may be represented by a telecommunication network, a wireless or cable network, or the Internet.

The present invention may be a computer system that comprises a microprocessor and memory which stores the above computer program, and the microprocessor may execute the stored computer program to achieve the present invention. The above computer program or digital signals may be recorded on the computer-readable recording medium to be distributed via the network or other distribution methods to a computer system.

The above embodiment and example modifications may be combined.

As has been described, the present invention can restrict viewing of interactive data during a preview time. This therefore prevents the user from viewing all the interactive data during the preview time. In addition, the present invention prohibits interactive data from being presented or operated in the viewing prohibited state. As a result, the user cannot view, in the viewing prohibited state, interactive data that has been stored during the preview time. Further, a program producer can freely determine interactive data operable during a preview time and present the interactive data in a manner that encourages users to purchase a program.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A digital broadcast receiving device that receives a broadcast wave including interactive data to achieve pseudo-interactive communications, the interactive data being repeatedly broadcast, the digital broadcast receiving device comprising:

a receiving unit for receiving the broadcast wave which includes first information and second information, the second information having conditions for using the broadcast wave, and the first information being recorded on a recording medium;

a judging unit for judging a state that is established during the reception of the broadcast wave based on the first information, the state being one of a preview state, a prohibited state, and a permitted state the judging unit including an obtaining subunit for obtaining the first information from the recording medium, wherein the first information shows conditions for using the received broadcast wave under a subscription contract;
a contract judging subunit for judging whether the first information and the second information are the same, determining that a subscription contract is made, on judging that the first and second information are the same, and determining that the subscription contract is not made, on judging that the first and second information are not the same; a preview state judging subunit for (a) judging whether a predetermined period has passed since a start of reception of the broadcast wave, if the contract judging subunit determines that the subscription contract is not made, (b) determining that the preview state is established during reception, on judging that the predetermined period has not passed, and (c) determining that the prohibited state is established during reception, on judging that the predetermined period has already passed,
wherein in the preview state, the received broadcast wave may be permitted to be used regardless of the subscription contract being made, and
wherein in the prohibited state, the broadcast wave is prohibited from being used because the subscription contract is not made; and
a restricting unit for restricting use of the interactive data when the preview state is judged as established, regardless of a subscription contract being made, or the prohibited state being judged as established.

2. The digital broadcast receiving device of claim 1,
wherein the interactive data contains a plurality of sets of presentation data and a plurality of pieces of link information,
each set of the presentation data is associated with a piece of the link information, and
each piece of the link information indicates a link to another set of the presentation data that is different from the set of the presentation data associated with the piece of the link information,
wherein one of the plurality of sets of presentation data is currently displayed,
wherein the restricting unit further includes
a user input receiving subunit for receiving a user operation relating to the displayed set of presentation data;
a link subunit for (a) specifying, based on the received user operation, a set of presentation data that is a link destination of a link associated by the link information with the displayed set of presentation data if either the preview state or the prohibited state is judged as being established, (b) judging whether the specified set of presentation data and the displayed set of presentation data are included in a same group, (c) obtaining the specified set of presentation data on judging that the specified set of presentation data and the displayed set of presentation data are included in the same group, and (d) restricting use of interactive data relating to the received user operation on judging that the specified set of presentation data and the displayed set of presentation data are not included in the same group; and
a presenting subunit for presenting the obtained set of presentation data.

3. The digital broadcast receiving device of claim 2,
wherein the broadcast wave includes a plurality of components, and one component out of the plurality of components includes sets of presentation data, and another component out of the plurality of components includes other sets of presentation data that are different from the sets of presentation data included in the one component, and
wherein the link unit judges that the specified set of presentation data and the displayed set of presentation data are included in the same group if the specified set of presentation data and the displayed set of presentation data are included in a same component.

4. The digital broadcast receiving device of claim 2,
wherein the broadcast wave includes a plurality of components, and at least two components out of the plurality of components each include a plurality of sets of reception data, each set of reception data containing a plurality of sets of presentation data, and
wherein the link unit judges that the specified set of presentation data and the displayed set of presentation data are included in the same group if the specified set of presentation data and the displayed set of presentation data are included in a same set of reception data.

5. The digital broadcast receiving device of claim 2,
wherein the broadcast wave includes a plurality of components, and one component out of the plurality of components includes sets of reception data, and another component out of the plurality of components includes other sets of reception data that are different from the sets of reception data included in the one component, and each set of reception data containing a plurality of sets of presentation data,
wherein the link unit judges that the specified set of presentation data and the displayed set of presentation data are included in the same group if the specified set of presentation data is same as the displayed set of presentation data.

6. The digital broadcast receiving device of claim 1,
wherein the interactive data contains (a) a plurality of sets of presentation data, (b) a plurality of pieces of link information, and (c) a script,
each set of the presentation data is associated with a piece of the link information,
each piece of the link information indicates a link to another set of presentation data that is different from the set of presentation data associated with the piece of link information, and
the script contains a procedure to restrict use of the interactive data,
wherein the restricting unit restricts the use of the interactive data by analyzing and executing the script.

7. The digital broadcast receiving device of claim 6,
wherein the script also contains a first description that describes a prohibition of a link operation designated by a user, the prohibition being made if either the preview state or the prohibited state is judged as being established, and a second description that describes a permission to perform the designated link operation if the permitted state is judged as being established,
wherein one of the plurality of sets of presentation data is currently displayed,
wherein the restricting unit further includes
a user operation receiving subunit for receiving a user operation that designates the link operation;
a script executing subunit for (a) analyzing the script, (b) restricting the designated link operation on recognizing the first description in the script if either the preview state or the prohibited state is judged as being established, and (c) obtaining a set of presentation data which is a link destination of the designated link operation on recognizing the second description if the permitted state is judged as being established; and a presenting subunit for presenting the obtained set of presentation data.

8. The digital broadcast receiving device of claim 7, wherein the second description also describes a presentation of a message relating to the prohibition of the link operation and wherein on recognizing the message in the script, the script executing unit presents the message.

9. The digital broadcast receiving device of claim 1, wherein the interactive data contains (a) a plurality of sets of presentation data, (b) a plurality of pieces of link information, and (c) a viewing enabled signal, each set of the presentation data is associated with a piece of the link information, each piece of the link information indicates a link to another set of the presentation data that is different from the set of the presentation data associated with the piece of the link information, and the viewing enabled signal indicates either a viewing permission or a preview permission, wherein one of the plurality of sets of presentation data is currently displayed, wherin the restricting unit further includes a user operation receiving subunit for receiving a user operation that designates a link operation;

a link subunit for obtaining a set of presentation data which is a link destination of the designated link operation if either a first condition or a second condition is fulfilled, and for restricting use of interactive data relating to the received user operation if neither the first condition nor the second condition is fulfilled, wherein in the first condition, the viewing enabled signal indicates the preview permission, and the preview state is judged as being established, and wherein in the second condition, the viewing enabled signal indicates the viewing permission, and the permitted state is judged as being established; and a presenting subunit for presenting the obtained set of presentation data.

10. The digital broadcast receiving device of claim 1, wherein the interactive data contains a plurality of sets of presentation data and a plurality of pieces of link information, each set of the presentation data is associated with a piece of the link information, and each piece of the link information indicates a link to another set of the presentation data that is different from the set of the presentation data associated with the piece of the link information, wherein one of the plurality of sets of presentation data is currently displayed, wherein the restricting unit further includes a user operation receiving subunit for receiving a user operation;

a counting subunit for counting a number of user operations that have been received;

a link subunit for restricting use of interactive data relating to the received user operation when the counted number reaches a predetermined number and either the preview state or the prohibited state is judged as being established.

11. The digital broadcast receiving device of claim 1, wherein the interactive data contains a plurality of sets of presentation data and a plurality of pieces of link information, each set of the presentation data is associated with a piece of the link information, and each piece of the link information indicates a link to another set of the presentation data that is different from the set of the presentation data associated with the piece of the link information, wherein one of the plurality of sets of presentation data is currently displayed, wherein the restricting unit further includes a user operation receiving subunit for receiving a user operation that designates a link operation;

a link subunit for restricting use of interactive data relating to the received user operation if either the preview state or the prohibited state is judged as being established, and for obtaining a set of presentation data which is a link destination of the designated link operation if the permitted state is judged as being established; and a presenting subunit for presenting the obtained set of presentation data.

12. The digital broadcast receiving device of claim 11, wherein the link subunit also places a restriction on obtainment of the set of presentation data that is the link destination if either the preview state or the prohibited state is judged as being established.

13. A digital broadcast system, comprising:

a digital broadcast sending device that broadcasts a wave containing interactive data, the interactive data being repeatedly broadcast; and a digital broadcast receiving device that receives the broadcast wave to achieve pseudo-interactive communications, the interactive data being repeatedly received, the digital broadcast receiving device including:

a receiving unit for receiving the broadcast wave, which includes first information and second information, the second information having conditions for using the broadcast wave, and the first information being recorded on a recording medium;

a judging unit for judging a state that is established during the reception of the broadcast wave based on first information, the state being one of a preview state, a prohibited state, and a permitted state, the judging unit including an obtaining subunit for obtaining the first information from the recording medium, wherein the first information shows conditions for using the received broadcast wave under a subscription contract; a contract judging subunit for judging whether the first information and the second information are the same, determining that a subscription contract is made, on judging that the first and second information are the same, and determining that the subscription contract is not made on judging that the first and second information are not the same; a preview state judging subunit for (a) judging whether a predetermined period has passed since a start of reception of the broadcast wave, if the contracting judging subunit determines that a subscription contract is not made, (b) determining that a preview state is established during reception, on judging that the predetermined period has not passed, and (c) determining that a prohibited state is established during reception, on judging that the predetermined period has already passed, wherein in the preview state, the received broadcast wave may be permitted to be used regardless of the subscription contract being made, and wherein in the prohibited state, the broadcast wave is prohibited from being used because the subscription contract is not made; and a restricting unit for restricting use of the interactive data when the preview state is judged as being established, regardless of a subscription contract being made, or the prohibited state being judged as established.

14. A receiving method used by a digital broadcast receiving device, which receives a broadcast wave including interactive data to achieve pseudo-interactive communications, the interactive data being repeatedly broadcast, the receiving method comprising the steps of:

receiving the broadcast wave; which includes first information and second information, the second information having conditions for using the broadcast wave, and the first information being recorded on a recording medium;

judging a state that is established during reception of the broadcast wave, based on first information, the state being one of a preview state, a prohibited state, and a permitted state;

obtaining the first information from the recording medium, wherein the first information shows conditions for using the received broadcast wave under a subscription contract;

determining that a subscription contract is made, on judging that the first and second information are the same;

determining that a subscription contract is not made, on judging that the first and second information are not the same;

judging whether a predetermined period has passed since start of reception of the broadcast wave, if it has been determined that the subscription contract is not made;

determining that a preview state is established during reception, on judging that the predetermined period has not passed;

determining that a prohibited state is established during reception, on judging that the predetermined period has already passed;

wherein in the preview state, the received broadcast wave may be permitted to be used regardless of the subscription contract being made, and wherein in the prohibited state, the broadcast wave is prohibited from being used because the subscription contract is not made; and restricting use of the interactive data when the preview state is judged as being established, regardless of a subscription contract being made, or the prohibited state being judged as established.

15. A machine readable medium, that provides instructions, which when executed by a machine in a digital broadcast receiving device which receives a broadcast wave including interactive data to achieve pseudo-interactive communications, cause the machine to perform operations comprising:

receiving the broadcast wave which includes first information and second information, the second information having conditions for using the broadcast wave, and the first information being recorded on a recording medium;

judging a state that is established during the reception of the broadcast wave based on first information, the state being one of a preview state, a prohibited state, and a permitted state;

obtaining the first information from the recording medium, wherein the first information shows conditions for using the received broadcast wave under a subscription contract;

determining that a subscription contract is made, on judging that the first and second information are the same;

determining that a subscription contract is not made, on judging that the first and second information are not the same;

judging whether a predetermined period has passed since start of reception of the broadcast wave, if it has been determined that the subscription contract is not made;

determining that a preview state is established during reception, on judging that the predetermined period has not passed;

determining that the prohibited state is established during reception, on judging that the predetermined period has already passed, wherein in the preview state, the received broadcast wave is permitted to be used regardless of the subscription contract being made, and wherein in the prohibited state, the broadcast wave is prohibited from being used because the subscription contract is not made; and restricting use of the interactive data when the preview state is judged as being established, regardless of a subscription contract being made, or the prohibited state being judged as established.

* * * * *